US012597377B2

(12) United States Patent
Kim

(10) Patent No.: US 12,597,377 B2
(45) Date of Patent: Apr. 7, 2026

(54) DISPLAY DEVICE AND METHOD OF DRIVING THE SAME, AND ELECTRONIC DEVICE

(71) Applicant: Samsung Display Co., LTD., Yongin-si (KR)

(72) Inventor: Woung Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/066,447

(22) Filed: Feb. 28, 2025

(65) Prior Publication Data

US 2025/0384806 A1 Dec. 18, 2025

(30) Foreign Application Priority Data

Jun. 17, 2024 (KR) ........................ 10-2024-0078425
Sep. 9, 2024 (KR) ........................ 10-2024-0122315

(51) Int. Cl.
*G09G 3/20* (2006.01)
*G09G 3/3233* (2016.01)

(52) U.S. Cl.
CPC ......... *G09G 3/2007* (2013.01); *G09G 3/3233* (2013.01); *G09G 2300/0819* (2013.01); *G09G 2300/0842* (2013.01); *G09G 2310/06* (2013.01); *G09G 2310/08* (2013.01); *G09G 2320/0233* (2013.01); *G09G 2320/0238* (2013.01); *G09G 2320/0666* (2013.01); *G09G 2320/0673* (2013.01); *G09G 2330/023* (2013.01)

(58) Field of Classification Search
CPC ............... G09G 3/2007; G09G 3/3233; G09G 2300/0819; G09G 2310/08; G09G 2300/0842; G09G 2310/06; G09G 2320/0233; G09G 2330/023; G09G 2320/0673; G09G 2320/0238; G09G 2320/0666
See application file for complete search history.

(56) References Cited

U.S. PATENT DOCUMENTS

2016/0049113 A1* 2/2016 Park ..................... G09G 3/3208
345/212
2017/0124985 A1* 5/2017 Kim ......................... G09G 3/34
2017/0316744 A1* 11/2017 Oh ....................... G09G 3/2007

FOREIGN PATENT DOCUMENTS

KR 102469801 B1 11/2022

* cited by examiner

*Primary Examiner* — Muhammad N Edun
(74) *Attorney, Agent, or Firm* — CANTOR COLBURN LLP

(57) ABSTRACT

A display device includes: pixels connected to scan lines and data lines; a data driver for generating a data signal to be supplied to the data lines, using gamma voltages; and a gamma driver for generating the gamma voltages. The gamma driver includes a minimum grayscale voltage generator configured to store a first reference black grayscale voltage corresponding to a first reference dimming level and a second reference black grayscale voltage which corresponds to a second reference dimming level and has a voltage lower than the first reference black grayscale voltage, and generate an auxiliary black grayscale voltage of an auxiliary dimming level between the first reference dimming level and the second reference dimming level. The auxiliary black grayscale voltage has a voltage higher than a voltage obtained by interpolating the first reference black grayscale voltage and the second reference black grayscale voltage at the auxiliary dimming level.

20 Claims, 10 Drawing Sheets

V0_I1F1: V0_I1F1_R, V0_I1F1_G, V0_I1F1_B
V0_I0: V0_I0_R, V0_I0_G, V0_I0_B

DISPLAY DEVICE AND METHOD OF DRIVING THE SAME, AND ELECTRONIC DEVICE

The application claims priority to Korean patent application No. 10-2024-0078425 filed on Jun. 17, 2024, and Korean patent application No. 10-2024-0122315 filed on Sep. 9, 2024, and all the benefits accruing therefrom under 35 U.S.C. § 119, the contents of which in their entirety are herein incorporated by reference.

BACKGROUND

1. Technical Field

The present disclosure generally relates to a display device and a method of driving the same, and electronic device.

2. Related Art

As the information society is developed, demands for display devices for displaying images have increased in various forms. For example, the display devices have been applied to various electronic devices such as smartphones, digital cameras, notebook computers, navigation systems, and smart televisions.

A display device may be driven corresponding to various dimming levels. It is desirable for a method capable of reducing power consumption and improving display quality when the display device is driven corresponding to various dimming levels.

SUMMARY

Embodiments provide a display device and a method of driving the same, which can reduce power consumption and improve display quality when the display device is driven at various dimming levels.

In accordance with an aspect of the present disclosure, there is provided a display device including: pixels connected to scan lines and data lines; a data driver configured to generate a data signal to be supplied to the data lines, using gamma voltages; and a gamma driver configured to generate the gamma voltages, wherein the gamma driver includes a minimum grayscale voltage generator configured to store a first reference black grayscale voltage corresponding to a first reference dimming level and a second reference black grayscale voltage which corresponds to a second reference dimming level and has a voltage lower than the first reference black grayscale voltage, and generate an auxiliary black grayscale voltage of at least one auxiliary dimming level between the first reference dimming level and the second reference dimming level, and wherein the auxiliary black grayscale voltage has a voltage higher than a voltage obtained by interpolating the first reference black grayscale voltage and the second reference black grayscale voltage at the auxiliary dimming level.

The auxiliary black grayscale voltage may have a voltage higher than an average voltage of the first reference black grayscale voltage and the second reference black grayscale voltage.

The gamma driver may further include a first controller configured to supply, to the minimum grayscale voltage generator, a weighted value corresponding to a current dimming level and a current driving frequency, at which the display device is driven. The minimum grayscale voltage generator may generate the auxiliary black grayscale voltage, using the weighted value.

The minimum grayscale voltage generator may generate the auxiliary black grayscale voltage by reflecting the weighted value on the first reference black grayscale voltage.

The minimum grayscale voltage generator may generate the auxiliary black grayscale voltage by reflecting the weighted value on the second reference black grayscale voltage.

The minimum grayscale voltage generator may generate the auxiliary black grayscale voltage by reflecting the weighted value on an average voltage of the first reference black grayscale voltage and the second reference black grayscale voltage or an interpolation voltage of the first reference black grayscale voltage and the second reference black grayscale voltage.

The pixels may include a first pixel emitting light of a first color, a second pixel emitting light of a second color, and a third pixel emitting light of a third color.

The weighted value may have the same value in the first pixel, the second pixel, and the third pixel.

The weighted value may have different values in at least two pixels among the first pixel, the second pixel, and the third pixel.

The first pixel may be a red pixel and the second pixel may be a green pixel. The weighted value may be set such that the auxiliary black grayscale voltage for the first pixel has a voltage higher than the black grayscale voltage for the second pixel.

The second pixel may be a green pixel and the third pixel may be a blue pixel. The weighted value may be set such that the auxiliary black grayscale voltage for the third pixel has a voltage higher than the auxiliary black grayscale voltage for the second pixel.

The gamma driver may further include: a reference gamma voltage generator configured to generate a plurality of reference gamma voltages including a first reference gamma voltage corresponding to a black grayscale, the current dimming level and the current driving frequency; and a gamma voltage generator configured to generate the gamma voltages by dividing a voltage of a first power source, based on the reference gamma voltages.

The minimum grayscale volage generator may generate the auxiliary black grayscale voltage by reflecting the weighted value on the first reference gamma voltage.

The gamma driver may further include: a second controller configured to store voltage information of the first power source, corresponding to a plurality of driving frequencies including the current driving frequency and a plurality of dimming levels including the current dimming level, and output voltage information of the first power source, corresponding to the current dimming level and the current driving frequency; and a voltage generator configured to supply, to the gamma voltage generator, the first power source having a voltage value corresponding to the voltage information output from the second controller.

The minimum grayscale voltage generator may generate a black grayscale voltage of dimming levels between the first reference dimming level and the auxiliary dimming level by interpolating the first reference black grayscale voltage and the auxiliary black grayscale voltage, and generate a black grayscale voltage of dimming levels between the second reference dimming level and the auxiliary dimming level by interpolating the second reference black grayscale voltage and the auxiliary black grayscale voltage.

The minimum grayscale voltage generator may set a voltage of a black grayscale to decrease as a driving frequency increases at the same dimming level.

In accordance with another aspect of the present disclosure, there is provided a method of driving a display device, the method including: storing a first reference black grayscale voltage corresponding to a first reference dimming level among a plurality of dimming levels and a second reference black grayscale voltage corresponding to a second reference dimming level among the plurality of dimming levels; and generating an auxiliary black grayscale voltage of at least one auxiliary dimming level between the first reference dimming level and the second reference dimming level, where the auxiliary black grayscale voltage has a voltage higher than a voltage obtained by interpolating the first reference black grayscale voltage and the second reference black grayscale voltage at the auxiliary dimming level.

The auxiliary black grayscale voltage may have a voltage higher than an average voltage of the first reference black grayscale voltage and the second reference black grayscale voltage.

The auxiliary black grayscale voltage may be generated by reflecting a weighted value on a reference gamma voltage corresponding to a black grayscale, the first reference black grayscale voltage, or the second reference black grayscale voltage.

In accordance with an aspect of the present disclosure, there is provided an electronic device including: a processor to provide input image data; a display device to display an image based on the input image data; wherein the display device including: pixels connected to scan lines and data lines; a data driver configured to generate a data signal to be supplied to the data lines, using gamma voltages; and a gamma driver configured to generate the gamma voltages, wherein the gamma driver includes a minimum grayscale voltage generator configured to store a first reference black grayscale voltage corresponding to a first reference dimming level and a second reference black grayscale voltage which corresponds to a second reference dimming level and has a voltage lower than the first reference black grayscale voltage, and generate an auxiliary black grayscale voltage of at least one auxiliary dimming level between the first reference dimming level and the second reference dimming level, and wherein the auxiliary black grayscale voltage has a voltage higher than a voltage obtained by interpolating the first reference black grayscale voltage and the second reference black grayscale voltage at the auxiliary dimming level.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
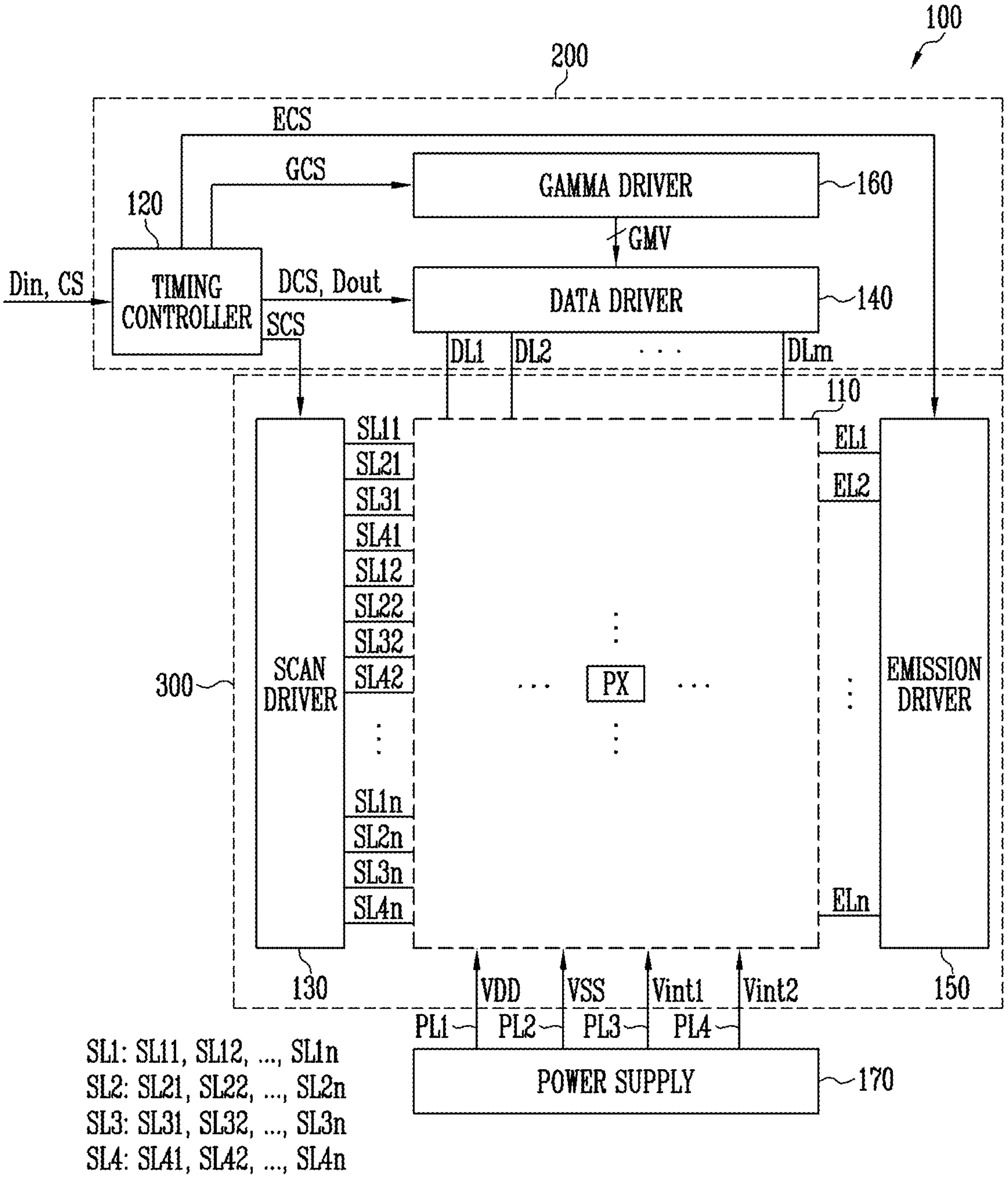
FIG. 1 is a diagram illustrating a display device in accordance with an embodiment of the present disclosure.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

In description, the expression "equal" may mean "substantially equal." That is, this may mean equality to a degree to which those skilled in the art can understand the equality. Other expressions may be expressions in which "substantially' is omitted.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the present disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the present disclosure. Also, in some embodiments, the blocks, the units, and/or the modules may be physically separated into more complex blocks, more complex units, and/or more complex modules without departing from the scope of the present disclosure.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The term "connection" between two components may include both electrical connection and physical connection, but the present disclosure is not necessarily limited thereto. For example, the term "connection" used based on circuit diagrams may mean electrical connection, and the term "connection" used based on sectional and plan views may mean physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the present disclosure.

Meanwhile, the present disclosure is not limited to embodiments disclosed below, and may be implemented in various forms. Each embodiment disclosed below may be independently embodied or be combined with at least another embodiment prior to being embodied.

Figure 2:
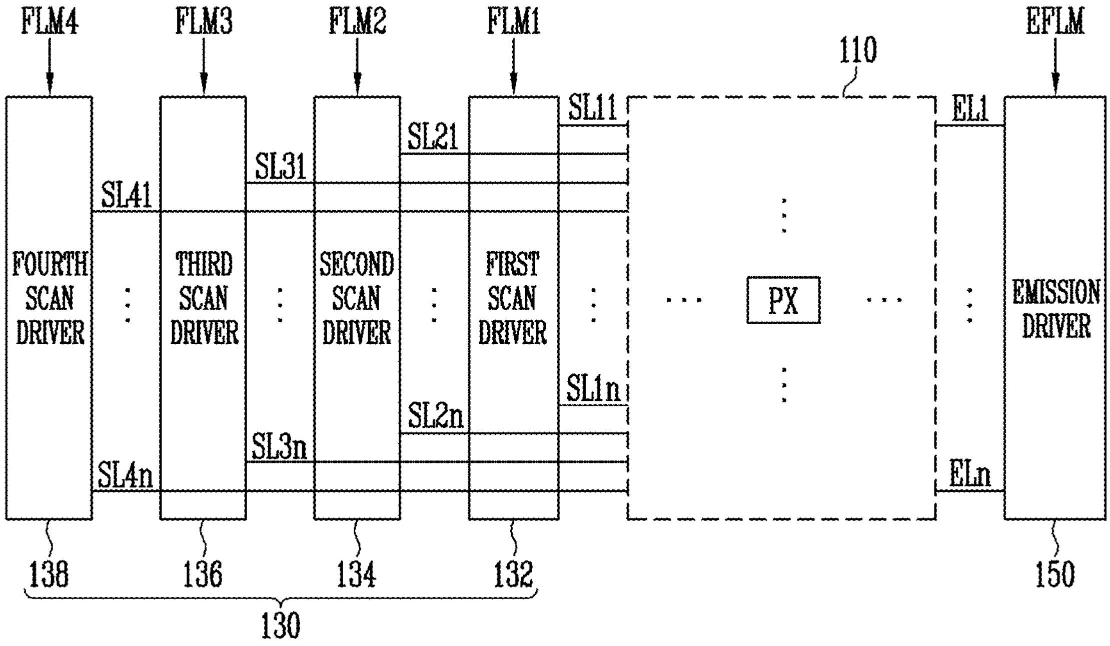
FIG. 2 is a diagram illustrating an embodiment of a scan driver and an emission driver, which are shown in FIG. 1.

FIG. 1 is a diagram illustrating a display device in accordance with an embodiment of the present disclosure. FIG. 2 is a diagram illustrating an embodiment of a scan driver and an emission driver, which are shown in FIG. 1.

Referring to FIGS. 1 and 2, the display device 100 in accordance with the embodiment of the present disclosure may include a display driver 200, a display unit 300, and a power supply 170.

The display driver 200 may control the display unit 300. To this end, the display driver 200 may include a timing controller 120, a data driver 140, and a gamma driver 160. The display driver 200 may be configured with one IC or be configured with a plurality of ICs. The display driver 200 may additionally include the power supply 170.

The display unit 300 may display a predetermined image. To this end, the display unit 300 may include a pixel unit 110, a scan driver 130, and an emission driver 150.

The pixel unit 110 may include pixels PX connected to first scan lines SL11, SL12, . . . , and SL1*n*, second scan lines SL21, SL22, . . . , and SL2*n*, third scan lines SL31, SL32, . . . , and SL3*n*, fourth scan lines SL41, SL42, . . . , and SL4*n*, data lines DL1, DL2, . . . , and DLm, emission control lines EL1, EL2, . . . , and ELn, and power lines PL1, PL2, PL3, and PL4 (n and m are natural numbers of 3 or more).

In an example, a pixel PXij (see FIG. 3) located on an ith horizontal line (or pixel row) and a jth vertical line (or pixel column) may be connected to an ith first scan line SL1*i*, an ith second scan line SL2*i*, an ith third scan line SL3*i*, an ith fourth scan line SL4*i*, an ith emission control line ELi, and a jth data line DLj (i is a natural number of n or less and j is a natural number of m or less).

Pixels PX may be selected in a horizontal line unit when an enable first scan signal is supplied to the first scan lines SL11 to SL1*n*. The pixels PX selected by the enable first scan signal may be supplied with a data signal from a data line (any one of DL1 to DLm) connected thereto. The pixel PX supplied with the data signal may generate light with a predetermined luminance, corresponding to a voltage of the data signal.

The pixels PX may include a first pixel, a second pixel, and a third pixel. The first pixel may include a first light emitting element emitting light of a first color. The first pixel may emit light of the first color, which has a predetermined luminance, corresponding to a data signal. The second pixel may include a second light emitting element emitting light of a second color. The second pixel may emit light of the second color, which has a predetermined luminance, corresponding to a data signal. The third pixel may include a third light emitting element emitting light of a third color. The third pixel may emit light of the third color, which has a predetermined luminance, corresponding to a data signal.

The first color may be a color different from the second color and the third color. In an example, the first color may be red, the second color may be a color different from the third color. In an example, the second color may be green. The third color may be blue.

The scan driver 130 may receive a scan driving signal SCS from the timing controller 120. At least one scan start signal and clock signals, which are for driving of the scan driver 130, may be included in the scan driving signal SCS. The scan driver 130 may generate the enable first scan signal, an enable second scan signal, an enable third scan signal, and an enable fourth scan signal while shifting the scan start signal, corresponding to a clock signal.

To this end, the scan driver 130 may include the first scan driver 132, a second scan driver 134, a third scan driver 136, and a fourth scan driver 138 as shown in FIG. 2. At least some of the scan drivers 132, 134, 136, and 138 may be integrated into one driving circuit, one module, or the like according to a design.

The first scan driver 132 may receive a first scan start signal FLM1, and generate the enable first scan signal while shifting the first scan start signal FLM1, corresponding to a clock signal. The first scan driver 132 may sequentially supply the enable first scan signal to the first scan lines SL11 to SL1*n*.

The second scan driver 134 may receive a second scan start signal FLM2, and generate the enable second scan signal while shifting the second scan start signal FLM2, corresponding to a clock signal. The second scan driver 134 may sequentially supply the enable second scan signal to second scan lines SL21 to SL2*n*.

The third scan driver 136 may receive a third scan start signal FLM3, and generate the enable third scan signal while shifting the third scan start signal FLM3, corresponding to a clock signal. The third scan driver 136 may sequentially supply the enable third scan signal to third scan lines SL31 to SL3*n*.

The fourth scan driver 138 may receive a fourth scan start signal FLM4, and generate the enable fourth scan signal while shifting the fourth scan start signal FLM4, corresponding to a clock signal.

The fourth scan driver 138 may sequentially supply the enable fourth scan signal to fourth scan lines SL41 to SL4*n*.

A scan signal may be divided into an enable scan signal and a disable scan signal. The enable first scan signal, the enable second scan signal, the enable third scan signal, and the enable fourth scan signal may have a gate-on voltage such that transistors included in the pixels PX can be turned on. In an example, an enable scan signal supplied to a P-type transistor may have a logic low level voltage.

A disable first scan signal, a disable second scan signal, a disable third scan signal, and a disable fourth scan signal may have a gate-off voltage such that the transistors included in the pixels PX can be turned off. In an example, a disable scan signal supplied to the P-type transistor may have a logic high level voltage.

In FIG. 2, it is illustrated that the first scan driver 132, the second scan driver 134, the third scan driver 136, and the fourth scan driver 138 are connected to a first scan line SL1, a second scan line SL2, a third scan line SL3, and a fourth scan line SL4, respectively. However, the embodiment of the present disclosure is not limited thereto. In another example, at least two scan lines among the first scan line SL1, the second scan line SL2, the third scan line SL3, and the fourth scan line SL4 (i.e., at least two of SL1, SL2, SL3, and SL4) may be driven by one scan driver.

The gamma driver 160 may receive a gamma driving signal GCS from the timing controller 120. A driving frequency (or image refresh rate) of the display device 100 and dimming level information may be included in the gamma driving signal GCS. The gamma driver 160 may generate gamma voltages GMV, based on the gamma driving signal GCS, and supply the generated gamma voltages GMV to the data driver 140. The gamma voltages GMV may be voltages corresponding to grayscales, respectively. In an example, voltages corresponding to grayscales 0 to 255 may be included in the gamma voltages GMV.

The data driver 140 may receive output data Dout and a data driving signal DCS from the timing controller 120. The data driver 140 may receive the gamma voltages GMV from the gamma driver 160. The data driving signal DCS may include a sampling signal and/or timing signals for driving of the data driver 140.

The data driver 140 may generate a data signal, based on the data driving signal DCS, the output data Dout, and the gamma voltages GMV. In an example, the data driver 140 may select any one voltage among the gamma voltages GMV, corresponding to a grayscale of each of the output data, and supply the selected voltage as the data signal to the data lines DL1 to DLm. The data driver 140 may supply the data signal in one horizontal period unit.

The emission driver 150 may receive an emission driving signal ECS from the timing controller 120. An emission start signal and clock signals, which are for driving the emission driver 150, may be included in the emission driving signal ECS. The emission driver 150 may generate a disable emission control signal while shifting the emission start signal, corresponding to a clock signal.

As shown in FIG. 2, the emission driver 150 may receive an emission start signal EFLM, and generate a disable emission control signal by shifting the emission start signal EFLM, corresponding to a clock signal. The emission driver 150 may sequentially supply the disable emission control signal to the emission control lines EL1 to ELn.

An emission control signal may be divided into a disable emission control signal and an enable emission control signal. The disable emission control signal may have the gate-off voltage such that the transistors included in the pixels can be turned off. In an example, the disable emission control signal supplied to the P-type transistor may have the logic high level voltage.

The enable emission control signal may have the gate-on voltage such that the transistors included in the pixels PX can be turned on. In an example, the enable emission control signal supplied to the P-type transistor may have the logic low level voltage.

The timing controller 120 may receive input data Din and a control signal CS from a host system through an interface. In an example, the timing controller 120 may receive the input data Din and the control signal CS from at least one of a Graphics Processing Unit (GPU), a Central Processing Unit (CPU), and an Application Processor (AP), which are included in the host system. Various signals including a clock signal may be included in the control signal CS.

The timing controller 120 may generate the scan driving signal SCS, the data driving signal DCS, the emission driving signal ECS, and the gamma driving signal GCS, based on the control signal CS. The scan driving signal SCS, the data driving signal DCS, the emission driving signal ECS, and the gamma driving signal GCS may be supplied to the scan driver 130, the data driver 140, the emission driver 150, and the gamma driver 160, respectively.

The timing controller 120 may realign the input data Din to be suitable for specifications of the display device 100. Also, the timing controller 120 may generate the output data Dout by correcting the input data Din, and supply the output data Dout to the data driver 140. In an embodiment, the timing controller 120 may correct the input data Din, corresponding to an optical measurement result measured in a processing process.

The power supply 170 may generate various power sources for driving of the display device 100. In an example, the power supply 170 may generate a first driving power source VDD, a second driving power source VSS, a first initialization power source Vint1, and a second initialization power source Vint2.

The first driving power source VDD may be a power source which supplies a driving current to the pixels PX. The second driving power source VSS may be a power source which is supplied with the driving current from the pixels PX. The first driving power source VDD may be set to a voltage higher than a voltage of the second driving power source VSS during a period in which the pixels PX are set to be in an emission state.

The first initialization power source Vint1 may be a power source for initializing a gate electrode of a driving transistor included in each of the pixels PX. The first initialization power source Vint1 may be set to a voltage lower than the data signal. The second initialization power source Vint2 may be a power source for initializing a first electrode (or anode electrode) of a light emitting element LD (see FIG. 3) included in each of the pixels PX. The second initialization power source Vint2 may be set to a voltage at which the light emitting element LD is turned off.

The first driving power source VDD generated by the power supply 170 may be supplied to a first power line PL1, the second driving power source VSS generated by the power supply 170 may be supplied to a second power line PL2, the first initialization power source Vint1 generated by the power supply 170 may be supplied to a third power line PL3, and the second initialization power source Vint2 generated by the power supply 170 may be supplied to a fourth power line PL4. The first power line PL1, the second power line PL2, the third power line PL3, and the fourth power line PL4 may be commonly connected to the pixels PX, but the embodiment of the present disclosure is not limited thereto.

In an embodiment, the first power line PL1 may be configured with a plurality of power lines, and the plurality of power lines may be connected to different pixels PX. In an embodiment, the second power line PL2 may be configured with a plurality of power lines, and the plurality of power lines may be connected to different pixels PX. In an embodiment, the third power line PL3 may be configured with a plurality of power lines, and the plurality of power lines may be connected to different pixels PX. In an embodiment, the fourth power line PL4 may be configured with a plurality of power lines, and the plurality of power lines may be connected to different pixels PX. That is, in an embodiment of the present disclosure, each of the pixels PX may be connected to any one of the plurality of power lines constituting the first power line PL1, any one of the plurality of power lines constituting the second power line PL2, any one of the plurality of power lines constituting the third power line PL3, and any one of the plurality of power lines constituting the fourth power line PL4.

In an embodiment of the present disclosure, the display device 100 may include a flat display device, a curved display device in which a portion of the pixel unit 110 is curved, a flexible display device in which a portion of the pixel unit 110 is folded or bent, and a stretchable display device in which a portion of the pixel unit 110 is expanded/contracted.

In an embodiment of the present disclosure, the display device 100 is a device which displays moving images or still images, and may include portable electronic devices such as a mobile phone, a smartphone, a tablet personal computer (PC), a smart watch, a watch phone, a portable multimedia player (PMP), a navigation system, and an ultra mobile computer (UMPC). In an embodiment of the present disclosure, the display device 100 may include electronic devices such as a television, a notebook computer, a monitor, an advertisement board, and Internet of things (IOT).

Figure 3:
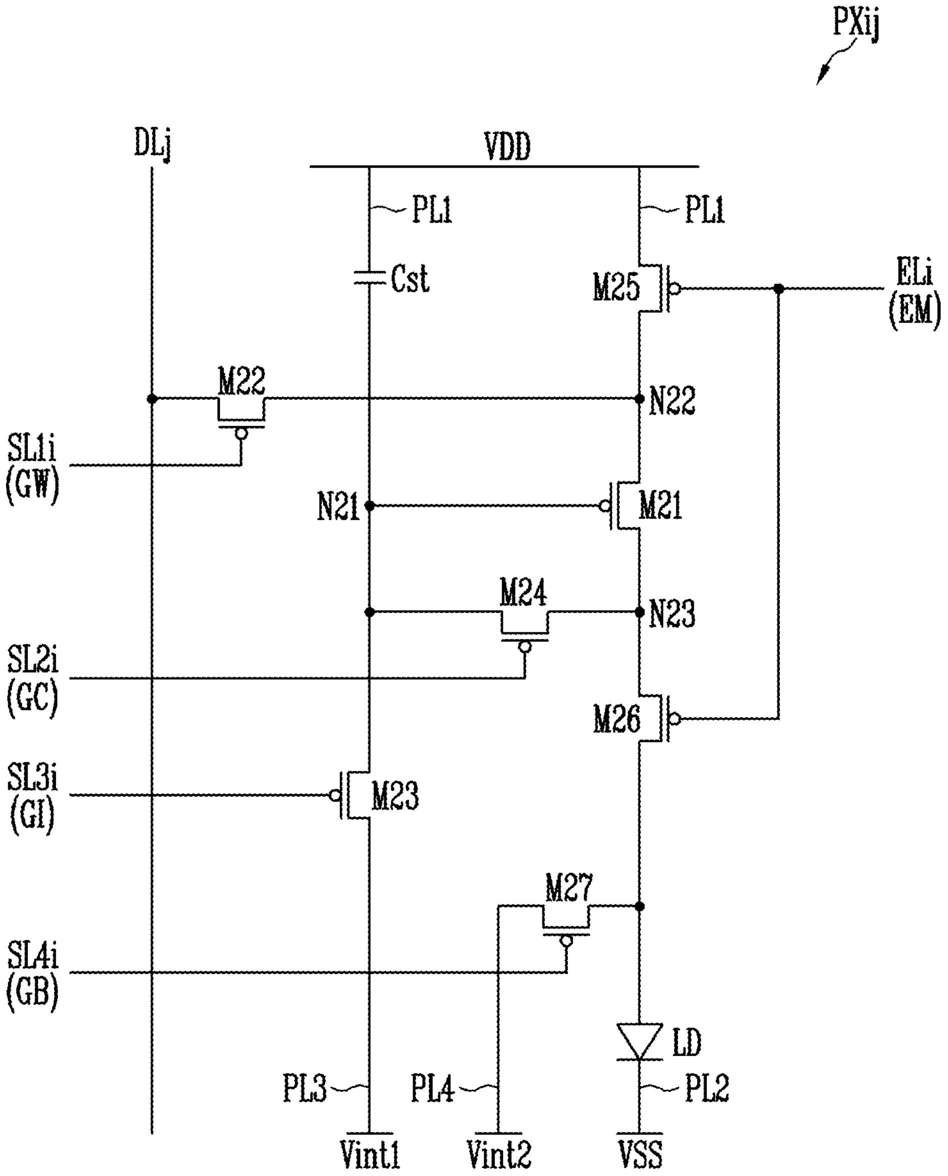
FIG. 3 is a diagram illustrating an embodiment of a pixel shown in FIG. 1.

FIG. 3 is a diagram illustrating an embodiment of the pixel shown in FIG. 1. In FIG. 3, a pixel PXij located on an ith horizontal line and a jth vertical line will be illustrated.

Referring to FIG. 3, the pixel PXij in accordance with the embodiment of the present disclosure may be connected to corresponding signal lines SL1*i*, SL2*i*, SL3*i*, SL4*i*, ELi, and DLj. For example, the pixel PXij may be connected to an ith first scan line SL1*i* (or first scan line), an ith second scan line SL2*i* (or second scan line), an ith third scan line SL3*i* (or third scan line), an ith fourth scan line SL4*i* (or fourth scan line), an ith emission control line ELi (or emission control line), and a jth data line DLj (or data line). In an embodiment, the pixel PXij may further connected to the first power line PL1, the second power line PL2, the third power line PL3, and the fourth power line PL4.

The pixel PXij in accordance with the embodiment of the present disclosure may include a light emitting element LD and a pixel circuit for controlling an amount of current supplied to the light emitting element LD.

The light emitting element LD may be connected between the first power line PL1 and the second power line PL2. In an example, a first electrode (or anode electrode) of the light emitting element LD may be electrically connected to the first power line PL1 via a sixth transistor M26, a third node N23, a first transistor M21, a second node N22, and a fifth transistor M25, and a second electrode (or cathode electrode) of the light emitting element LD may be electrically connected to the second power line PL2. The light emitting element LD may generate light with a predetermined luminance, corresponding to an amount of current supplied from the first power line PL1 to the second power PL2 via the pixel circuit.

The light emitting element LD may be selected as an organic light emitting diode. Also, the light emitting element LD may be selected as an inorganic light emitting diode such as a micro LED (light emitting diode) or a quantum dot light emitting diode. Also, the light emitting element LD may be an element configured with a combination of an organic material and an inorganic material. In FIG. 3, it is illustrated that the pixel PXij includes a single light emitting element LD. However, in another embodiment, the pixel PXij may include a plurality of light emitting elements LD, and the plurality of light emitting elements LD may be connected in series, parallel or series/parallel to each other.

The pixel circuit may include the first transistor M21, a second transistor M22, a third transistor M23, a fourth transistor M24, the fifth transistor M25, the sixth transistor M26, a seventh transistor M27, and a storage capacitor Cst.

A first electrode of the first transistor M21 (or driving transistor) may be connected to the second node N22, and a second electrode of the first transistor M21 may be connected to the third node N23. In addition, a gate electrode of the first transistor M21 may be connected to a first node N21. The first transistor M21 may control an amount of current supplied from the first driving power source VDD to the second driving power source VSS via the light emitting element LD, corresponding to a voltage of the first node N21.

The second transistor M22 may be connected between the data line DLj and the second node N22. In addition, a gate electrode of the second transistor M22 may be electrically connected to the first scan line SL1*i*. The second transistor M22 may be turned on when an enable first scan signal GW is supplied to the first scan line SL1*i*, to electrically connect the data line DLj and the second node N22 to each other.

A first electrode of the third transistor M23 may be connected to the first node N21, and a second electrode of the third transistor M23 may be electrically connected to the third power line PL3. In addition, a gate electrode of the third transistor M23 may be electrically connected to the third scan line SL3*i*. The third transistor M23 may be turned on when an enable third scan signal GI is supplied to the third scan line SL3*i*, to supply the voltage of the first initialization power source Vint1 to the first node N21.

The fourth transistor M24 may be connected between the first node N21 and the third node N23. In addition, a gate electrode of the fourth transistor M24 may be electrically connected to the second scan line SL2*i*. The fourth transistor M24 may be turned on when an enable second scan signal GC is supplied to the second scan line SL2*i*, to electrically connect the first node N21 and the third node N23 to each other. That is, when the fourth transistor M24 is turned on, the first transistor M21 may be diode-connected.

A first electrode of the fifth transistor M25 may be electrically connected to the first power line PL1, and a second electrode of the fifth transistor M25 may be connected to the second node N22. In addition, a gate electrode of the fifth transistor M25 may be electrically connected to an emission control line ELi. The fifth transistor M25 may be turned off when a disable emission control signal EM is supplied to the emission control line ELi, and be turned on when an enable emission control signal EM is supplied to the emission control line ELi.

The sixth transistor M26 may be connected between the third node N23 and the first electrode of the light emitting element LD. In addition, a gate electrode of the sixth transistor M26 may be electrically connected to the emission control line ELi. The sixth transistor M26 may be turned off when the disable emission control signal EM is supplied to the emission control line ELi, and be turned on when the enable emission control signal EM is supplied to the emission control line ELi.

A first electrode of the seventh transistor M27 may be connected to the first electrode of the light emitting element LD, and a second electrode of the seventh transistor M27 may be electrically connected to the fourth power line PL4. In addition, a gate electrode of the seventh transistor M27 may be electrically connected to the fourth scan line SL4*i*. The seventh transistor M27 may be turned on when an enable fourth scan signal GB is supplied to the fourth scan line SL4*i*, to supply the voltage of the second initialization power source Vint2 to the first electrode of the light emitting element LD.

When the voltage of the second initialization power source Vint2 is supplied to the first electrode of the light emitting element LD, a parasitic capacitor of the light emitting element LD may be discharged. As a residual voltage charged in the parasitic capacitor of the light emitting element LD is discharged (or removed), unintended minute emission can be prevented. Thus, the black expression ability of the pixel PXij can be improved.

The storage capacitor Cst may be connected between the first power line PL1 and the first node N21. The storage capacitor Cst may store a voltage applied to the first node N21.

Figure 4:
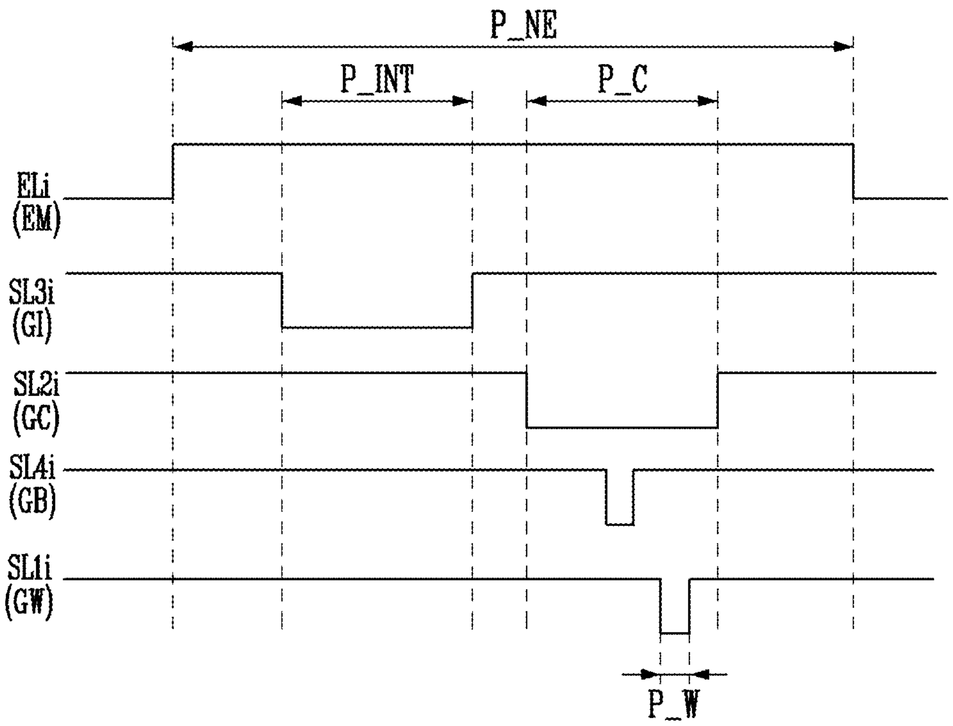
FIG. 4 is a waveform diagram illustrating an embodiment of a method of driving the pixel shown in FIG. 3.

FIG. 4 is a waveform diagram illustrating an embodiment of a method of driving the pixel shown in FIG. 3.

Referring to FIG. 4, one frame period may include a non-emission period P_NE, and the non-emission period P_NE may include an initialization period P_INT, a compensation period P_C, and a writing period P_W. The writing period P_W may be included in the compensation period P_C.

A disable emission control signal EM (or an emission control signal EM having a high level) may be supplied during the non-emission period P_NE. The fifth transistor M25 and the sixth transistor M26 may be turned off in response to the disable emission control signal EM, and the pixel PXij may not emit light.

An enable third scan signal GI may be supplied in the initialization period P_INT. When the enable third scan signal GI is supplied, the third transistor M23 may be turned on, the voltage of the first initialization power source Vint1 of the third power line PL3 may be provided to the first node N21.

An enable second scan signal GC may be supplied during the compensation period P_C. When the enable second scan signal GC is supplied, the fourth transistor M24 may be turned on, and the first transistor M21 may be diode-connected.

An enable first scan signal GW may be supplied in the writing period P_W. When the enable first scan signal GW is supplied, the second transistor M22 may be turned on, and a data signal may be provided from the jth data line DLj to the second node N22. Since the fourth transistor M24 is in a turn-on state by the enable second scan signal GC, the data signal may be transferred from the second node N22 to the first node N21 via the first transistor M21 and the fourth transistor M24. Since the diode-connection of the first transistor M21 is maintained by the turned-on fourth transistor M24, the first node N21 may have a voltage obtained by compensating for a threshold voltage of the first transistor M21 in the data signal.

Before the writing period P_W, an enable fourth scan signal GB may be supplied. When the enable fourth scan signal GB is supplied, the seventh transistor M27 may be turned on, and the voltage of the second initialization power source Vint2 may be supplied to the first electrode of the light emitting element LD.

After that, the non-emission period P_NE may be ended, and an enable emission control signal EM (or an emission control signal having a low level) may be supplied. When the enable emission control signal EM is supplied, the fifth transistor M25 and the sixth transistor M26 may be turned on. When the fifth transistor M25 and the sixth transistor M26 are turned on, a current flow path may be formed up to the second power line PL2 through the fifth transistor M25, the first transistor M21, the sixth transistor M26, and the light emitting element LD. A driving current corresponding to the voltage of the first node N21 may flow through the light emitting element LD according to an operation of the first transistor M21, and the light emitting element LD may emit light with a luminance corresponding to the driving current.

In order for the pixel PXij to stably implement a luminance, the first node N21 is to stably maintain the voltage of a data signal during one frame period. The first node N21 may be connected to the third power line PL3 via the third transistor M23, and be connected to the third node N23 via the fourth transistor M24. The voltage of the first node N21 may be changed by a leakage current caused by the third transistor M23 and the fourth transistor M24.

When the voltage of the first node N21 is changed by the leakage current when black is expressed in the pixel PXij, the pixel PXij may minutely emit light, which may become a main cause of deterioration of the display quality of the display device 100.

Figure 5:
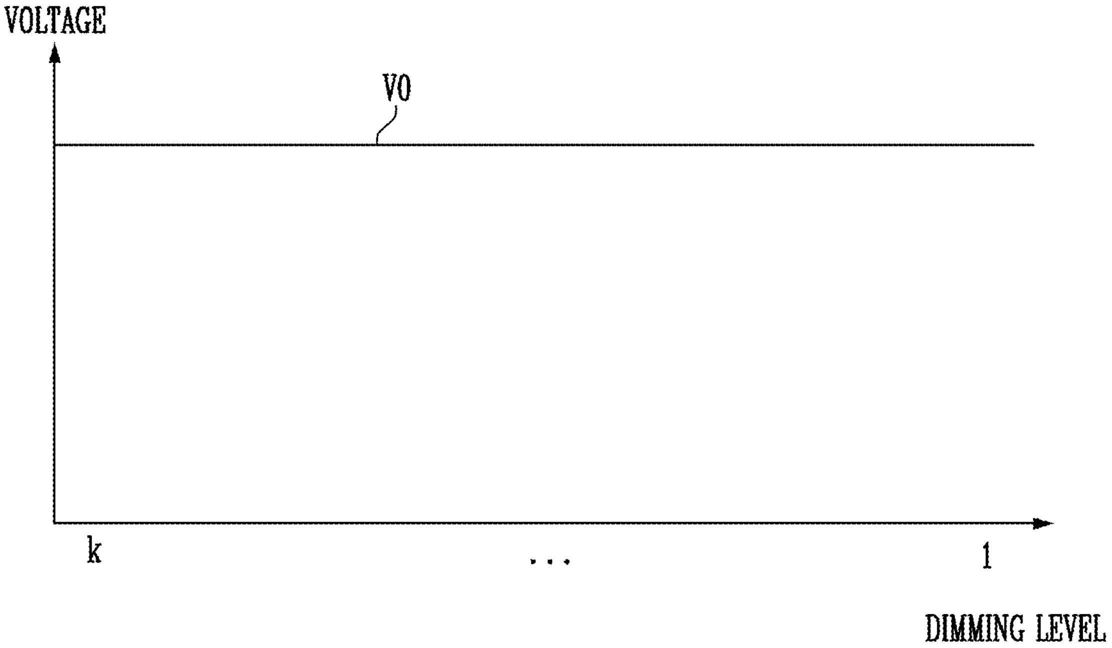
FIG. 5 is a diagram illustrating an embodiment of a black voltage corresponding to a dimming level.

FIG. 5 is a diagram illustrating an embodiment of a black voltage corresponding to a dimming level. In FIG. 5, a Y axis may represent voltage and an X axis may represent dimming level.

Referring to FIG. 5, "1" on the X axis may mean a 1-step dimming level, and "k" (k is a natural number of 2 or more) on the X axis may mean a k-step dimming level. The dimming level of the kth step (i.e., k-step) may be a dimming level of a highest step, which can be implemented in the display device 100. The dimming level may mean a maximum display luminance with which the display device 100 can emit light. For example, as the dimming level increases, the maximum display luminance which can be displayed in the pixel unit 110 may increase. The maximum display luminance may be a luminance measured when the entire pixel unit 110 emit light with a set maximum grayscale.

FIG. 5 may illustrate a case where the highest voltage which can be supplied regardless of dimming levels and driving frequencies is set as a voltage V0 of a black grayscale.

In general, when the dimming level is low, the range of luminances implemented in the display device 100 may be set narrow, and accordingly, the voltage V0 of the black grayscale may be set low. In addition, when the dimming level is high, the range of luminances implemented in the display device 100 may be set wide, and accordingly, the voltage V0 of the black grayscale is to be set high.

When the driving frequency of the display device 100 is high, one frame period may be shortened, and therefore, the voltage V0 of the black grayscale may be set low. In addition, when the driving frequency of the display device 100 is low, one frame period may be lengthened, and therefore, the voltage V0 of the black grayscale is to be set high.

In FIG. 5, a case where the voltage V0 of the black grayscale is set by considering a maximum dimming level and a minimum driving frequency of the display device 100 may be illustrated. Although lateral leakage occurs when black is expressed in the pixel PXij, the voltage of the first node N1 may have a sufficient voltage for expressing the black, and accordingly, the black expression ability of the display device 100 can be improved.

However, when the voltage V0 of the black grayscale is set by considering the maximum dimming level and the minimum driving frequency of the display device 100, power consumption may be increased. In addition, when the voltage V0 of the black grayscale is set high, an instantaneous afterimage and a color smear phenomenon may occur, and degradation may be rapidly made.

Figure 6:
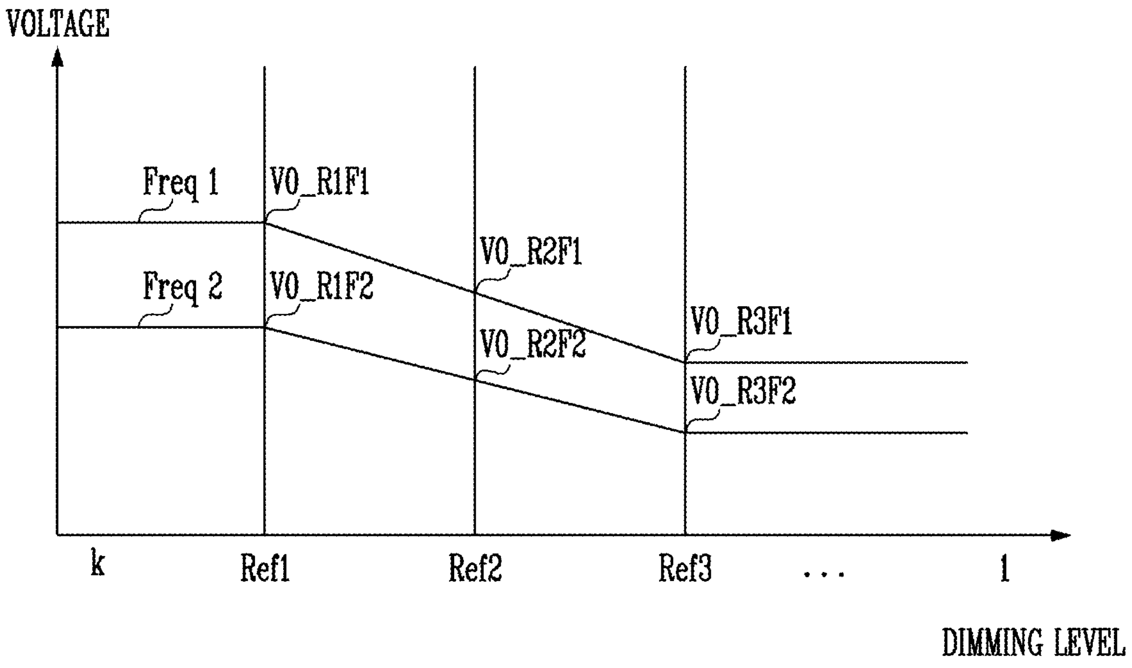
FIG. 6 is a diagram illustrating an embodiment of a black voltage corresponding to a dimming level.

FIG. 6 is a diagram illustrating an embodiment of a black voltage corresponding to a dimming level. In FIG. 6, a Y axis may represent voltage and an X axis may represent dimming level. In FIG. 6, Freq 1 may mean a first driving frequency Freq1, and Freq 2 may mean a second driving frequency Freq2. The first driving frequency Freq1 may have a lower driving frequency than the second driving frequency Freq2.

Referring to FIG. 6, the display device 100 may include a plurality of dimming levels, and some of the plurality of dimming levels may be classified into reference dimming levels Ref1, Ref2, and Ref3.

Black grayscale voltages V0_R1F1, V0_R2F1, V0_R3F1, V0_R1F2, V0_R2F2, and V0_R3F2 (or reference black grayscale voltages) corresponding to driving frequencies (e.g., Freq1 and Freq2) and reference dimming levels Ref1, Ref2, and Ref3 may be pre-stored in the gamma driver 160.

In an example, a first reference black grayscale voltage V0_R1F1 corresponding to a first reference dimming level Ref1 of a first driving frequency Freq1 may be stored in the gamma driver 160. The first reference dimming level Ref1 may be a dimming level lower than the k-step dimming level.

In an example, a second reference black grayscale voltage V0_R1F2 corresponding to the first reference dimming level Ref1 of a second driving frequency Freq2 may be stored in the gamma driver 160. The second reference black grayscale voltage V0_R1F2 may have a lower voltage than the first reference black grayscale voltage V0_R1F1.

In an example, a third reference black grayscale voltage V0_R2F1 corresponding to a second reference dimming level Ref2 of the first driving frequency Freq1 may be stored in the gamma driver 160. The third reference black grayscale voltage V0_R2F1 may have a lower voltage than the first reference black grayscale voltage V0_R1F1. The second reference dimming level Ref may be a dimming level lower than the first reference dimming level Ref1.

In an example, a fourth reference black grayscale voltage V0_R2F2 corresponding to the second reference dimming level Ref2 of the second driving frequency Freq2. The fourth reference black grayscale voltage V0_R2F2 may have a lower voltage than the third reference black grayscale voltage V0_R2F1. The fourth reference black grayscale voltage V0_R2F2 may have a lower voltage than the second reference black grayscale voltage V0_R1F2.

Similarly, a fifth reference black grayscale voltage V0_R3F1 corresponding to the first driving frequency Freq1 of a third reference dimming level Ref3 may be stored in the gamma driver 160. The fifth reference black grayscale voltage V0_R3F1 may have a lower voltage than the third reference black grayscale voltage V0_R2F1.

In addition, a sixth reference black grayscale voltage V0_R3F2 corresponding to the second driving frequency Freq2 of the third reference dimming level Ref3 may be stored in the gamma driver 160. The sixth reference black grayscale voltage V0_R3F2 may have a lower voltage than the fifth reference black grayscale voltage V0_R3F1. The sixth reference black grayscale voltage V0_R3F2 may have a lower voltage than the fourth reference black grayscale voltage V0_R2F2.

In the case of dimming levels between the reference dimming levels Ref1, Ref2, and Ref3, the gamma driver 160 may generate a black grayscale voltage by interpolating the reference black grayscale voltages V0_R1F1, V0_R2F1, V0_R3F1, V0_R1F2, V0_R2F2, and V0_R3F3.

In an example, when a predetermined dimming level is located between the first reference dimming level Ref1 and the second reference dimming level Ref2, and the display device 100 is driven at the first driving frequency Freq1, the gamma driver 160 may generate a black grayscale voltage of the predetermined dimming level by interpolating the first reference black grayscale voltage V0_R1F1 and the third reference black grayscale voltage V0_R2F1.

In an example, when a predetermine dimming level is located between the first reference dimming level Ref1 and the second reference dimming level Ref2, and the display device 100 is driven at the second driving frequency Freq2, the gamma driver 160 may generate a black grayscale voltage of the predetermined dimming level by interpolating the second reference black grayscale volage V0_R1F2 and the fourth reference black grayscale voltage V0_R2F2.

In an example, when a predetermine dimming level is located between the second reference dimming level Ref2 and the third reference dimming level Ref3, and the display device 100 is driven at the first driving frequency Freq1, the gamma driver 160 may generate a black grayscale voltage of the predetermined dimming level by interpolating the third reference black grayscale voltage V0_R2F1 and the fifth reference black grayscale voltage V0_R3F1.

In an example, when a predetermine dimming level is located between the second reference dimming level Ref2 and the third reference dimming level Ref3, and the display device 100 is driven at the second driving frequency Freq2, the gamma driver 160 may generate a black grayscale voltage of the predetermined dimming level by interpolating the fourth reference black grayscale voltage V0_R2F2 and the sixth reference black grayscale voltage V0_R3F2.

When the black grayscale voltage is differently set corresponding to each dimming level as shown in FIG. 6, power consumption may be reduced. However, when black grayscale voltages corresponding to predetermined dimming levels are generated by interpolating the reference black grayscale voltages V0_R1F1, V0_R2F1, V0_R3F1, V0_R1F2, V0_R2F2, and V0_R3F3, a black luminance may be increased at some dimming levels.

In an example, the second driving power source VSS, the emission time of the pixels PX, and the like may be changed corresponding to the dimming levels. When black grayscale voltages corresponding to predetermined dimming levels are generated by interpolating the reference black grayscale voltages V0_R1F1, V0_R2F1, V0_R3F1, V0_R1F2, V0_R2F2, and V0_R3F3, the black luminance may be increased at some dimming levels due to features in such a driving method.

In order to prevent this, a method of pre-storing, in the gamma driver 160, a black grayscale voltage corresponding to each dimming level and each driving frequency may be expected. However, when a black grayscale voltage corresponding to each dimming level and each driving frequency is pre-stored in the gamma driver 160, the capacity of a memory may be increased, and therefore manufacturing cost may be increased.

Figure 7:
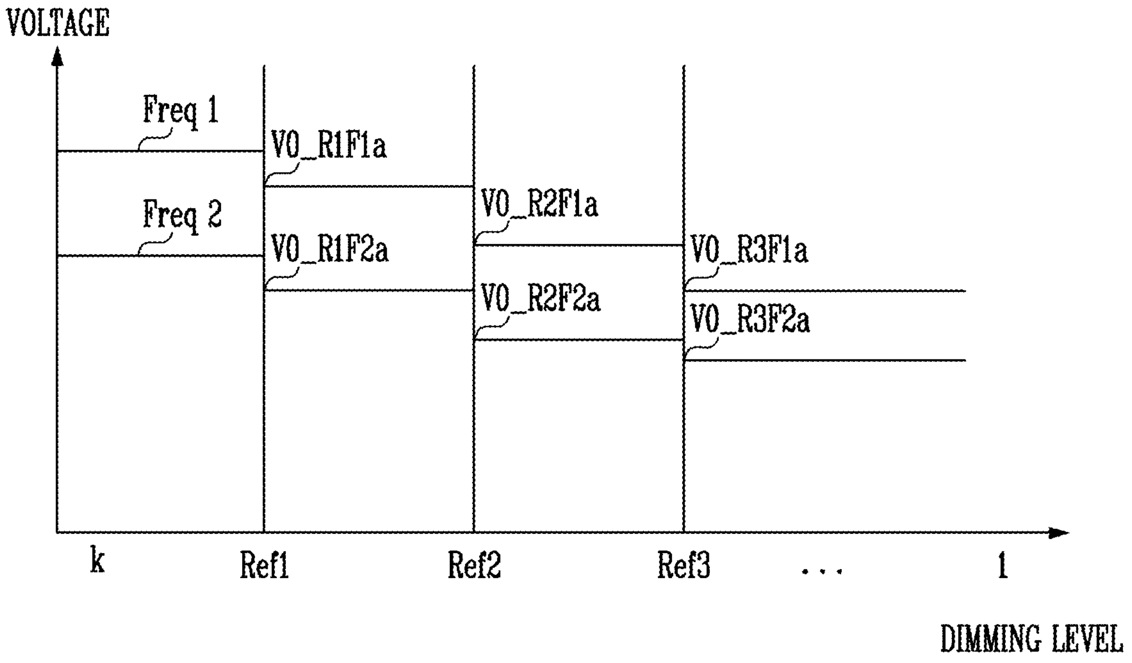
FIG. 7 is a diagram illustrating an embodiment of a black voltage corresponding to a dimming level.

FIG. 7 is a diagram illustrating an embodiment of a black voltage corresponding to a dimming level. In FIG. 7, a Y axis may represent voltage and an X axis may represent dimming level. In FIG. 7, Freq 1 may mean a first driving frequency Freq1, and Freq 2 may mean a second driving frequency Freq2.

Referring to FIG. 7, reference black grayscale voltages V0_R1F1*a*, V0_R2F1*a*, V0_R3F1*a*, V0_R1F2*a*, V0_R2F2*a*, and V0_R3F2*a* corresponding to driving frequencies (e.g., Freq1 and Freq2) and reference dimming levels Ref1, Ref2, and Ref3 may be pre-stored in the gamma driver 160.

In an example, a first reference black grayscale voltage V0_R1F1*a* corresponding to a first reference dimming level Ref1 of a first driving frequency Freq1 may be stored in the gamma driver 160. The first reference dimming level Ref1 may be a dimming level lower than the k-step dimming level.

In an example, a second reference black grayscale voltage V0_R1F2*a* corresponding to the first reference dimming level Ref1 of a second driving frequency Freq2 may be stored in the gamma driver 160. The second reference black grayscale voltage V0_R1F2*a* may have a lower voltage than the first reference black grayscale voltage V0_R1F1*a*.

In an example, a third reference black grayscale voltage V0_R2F1*a* corresponding to a second reference dimming level Ref2 of the first driving frequency Freq1 may be stored in the gamma driver 160. The third reference black grayscale voltage V0_R2F1*a* may have a lower voltage than the first reference black grayscale voltage V0_R1F1*a*. The second reference dimming level Ref2 may be a dimming level lower than the first reference dimming level Ref1.

In an example, a fourth reference black grayscale voltage V0_R2F2*a* corresponding to the second reference dimming level Ref2 of the second driving frequency Freq2 may be stored in the gamma driver 160. The fourth reference black grayscale voltage V0_R2F2*a* may have a lower voltage than the third reference black grayscale voltage V0_R2F1*a*. The fourth reference black grayscale voltage V0_R2F2*a* may have a lower voltage than the second reference black grayscale voltage V0_R1F2*a*.

Similarly, a fifth reference black grayscale voltage V0_R3F1*a* corresponding to a third reference dimming level Ref3 of the first driving frequency Freq1 may be stored in the gamma driver 160. In addition, a sixth reference black grayscale voltage V0_R3F2*a* corresponding to the third reference dimming level Ref3 of the second driving frequency Freq2 may be stored in the gamma driver 160.

In the case of dimming levels between the reference dimming levels Ref1, Ref2, and Ref3, the gamma driver 160 may generate a black grayscale voltage to have any one voltage among the reference black grayscale voltages V0_R1F1*a*, V0_R2F1*a*, V0_R3F1*a*, V0_R1F2*a*, V0_R2F2*a*, and V0_R3F2*a*.

In an example, when the display device 100 is driven at the first driving frequency Freq1, and dimming levels are located between the first reference dimming level Ref1 and the second reference dimming level Ref2, the first reference black grayscale voltage V0_R1F1*a* may be selected as the black grayscale voltage. That is, a black grayscale voltage of a predetermined dimming level may be selected as a high reference black grayscale voltage (e.g., V0_R1F1*a*) among reference black grayscale voltages (e.g., V0_R1F1*a* and V0_R2F1*a*) included in adjacent reference dimming levels (e.g., Ref1 and Ref2).

In an example, when the display device 100 is driven at the first driving frequency Freq1, and dimming levels are located between the second reference dimming level Ref2 and the third reference dimming level Ref3, the third reference black grayscale voltage V0_R2F1*a* may be selected as the black grayscale voltage.

In an example, when the display device 100 is driven at the first driving frequency Freq1, and dimming levels are lower than or equal to the third reference dimming level Ref3, the fifth reference black grayscale voltage V0_R3F1*a* may be selected as the black grayscale voltage.

In an example, when the display device 100 is driven at the second driving frequency Freq1, and dimming levels are located between the first reference dimming level Ref1 and the second reference dimming level Ref2, the second reference black grayscale voltage V0_R1F2*a* may be selected as the black grayscale voltage.

In an example, when the display device 100 is driven at the second driving frequency Freq1, and dimming levels are located between the second reference dimming level Ref2 and the third reference dimming level Ref3, the fourth reference black grayscale voltage V0_R2F2*a* may be selected as the black grayscale voltage.

In an example, when the display device 100 is driven at the second driving frequency Freq1, and dimming levels are lower than or equal to the third reference dimming level Ref3, the sixth reference black grayscale voltage V0_R3F2*a* may be selected as the black grayscale voltage.

When a black grayscale voltage of dimming levels is set as a high black grayscale voltage among black grayscale voltages corresponding adjacent reference dimming levels as shown in FIG. 7, a black luminance can be stably implemented in the pixels PX. However, when a black grayscale voltage of dimming levels included between the reference dimming levels is selected as a high black grayscale voltage among black grayscale voltages included in the reference dimming levels as shown in FIG. 7, power consumption may be increased.

Additionally, each of the reference black grayscale voltages V0_R1F1*a*, V0_R2F1*a*, V0_R3F1*a*, V0_R1F2*a*, V0_R2F2*a*, and V0_R3F2*a* shown in FIG. 7 may have a higher voltage than each of reference black grayscale voltages V0_R1F1, V0_R2F1, V0_R3F1, V0_R1F2, V0_R2F2, and V0_R3F2 shown in the other drawings.

Figure 8:
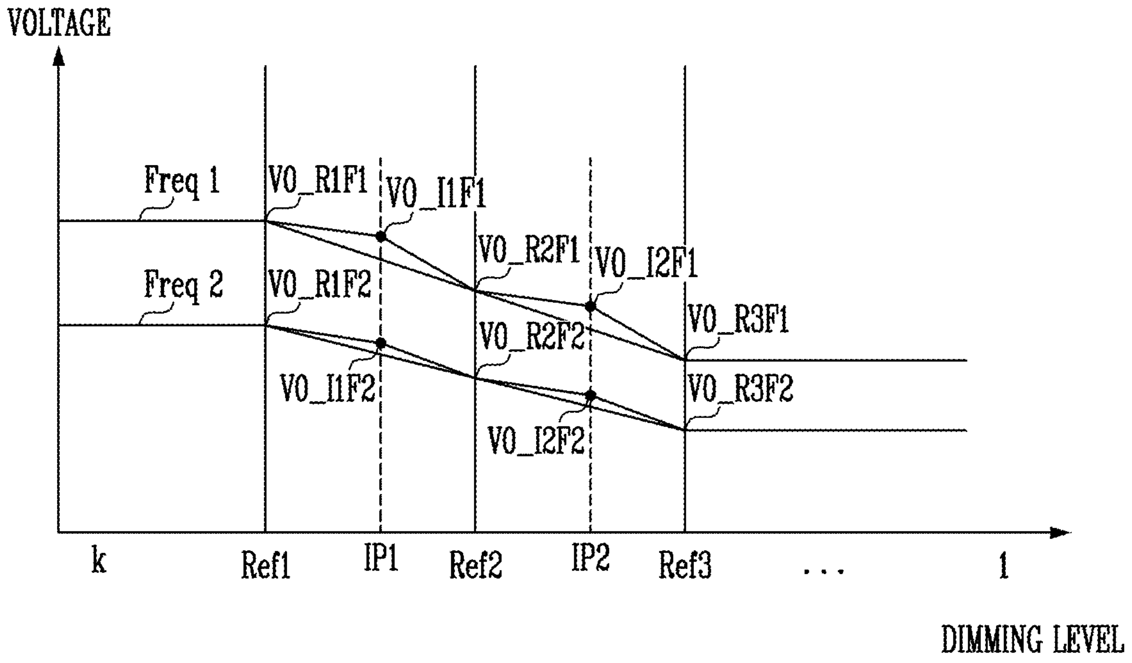
FIG. 8 is a diagram illustrating an embodiment of a black voltage corresponding to a dimming level.
Figure 9:
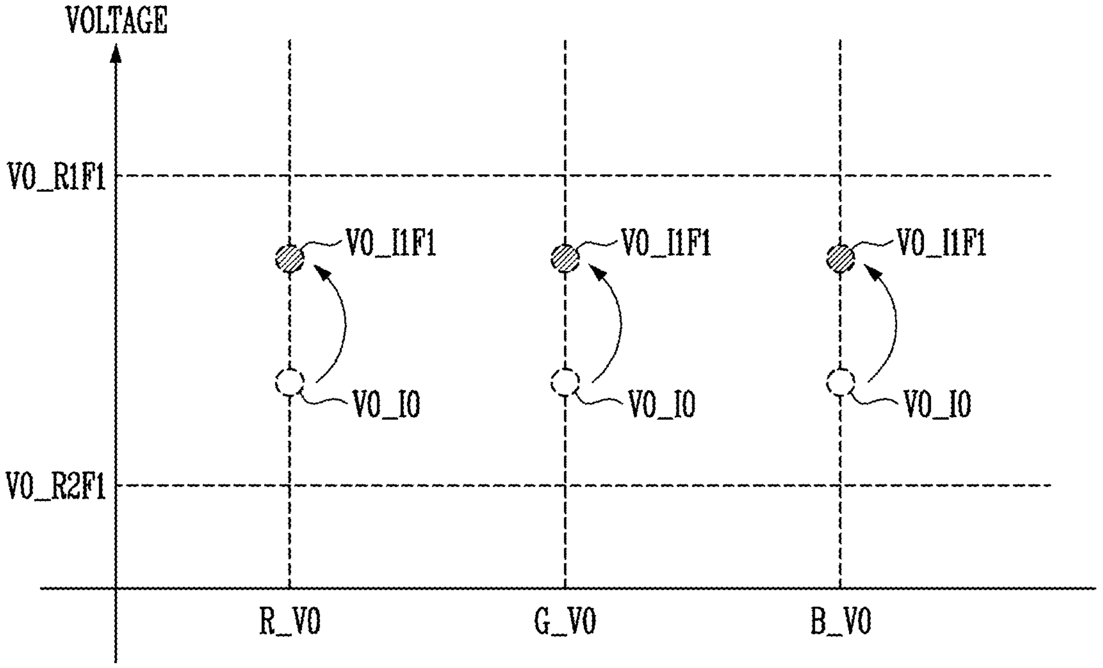
FIGS. 9 and 10 are diagrams illustrating a method of setting a black voltage corresponding to an auxiliary dimming level in accordance with an embodiment of the present disclosure.
Figure 10:
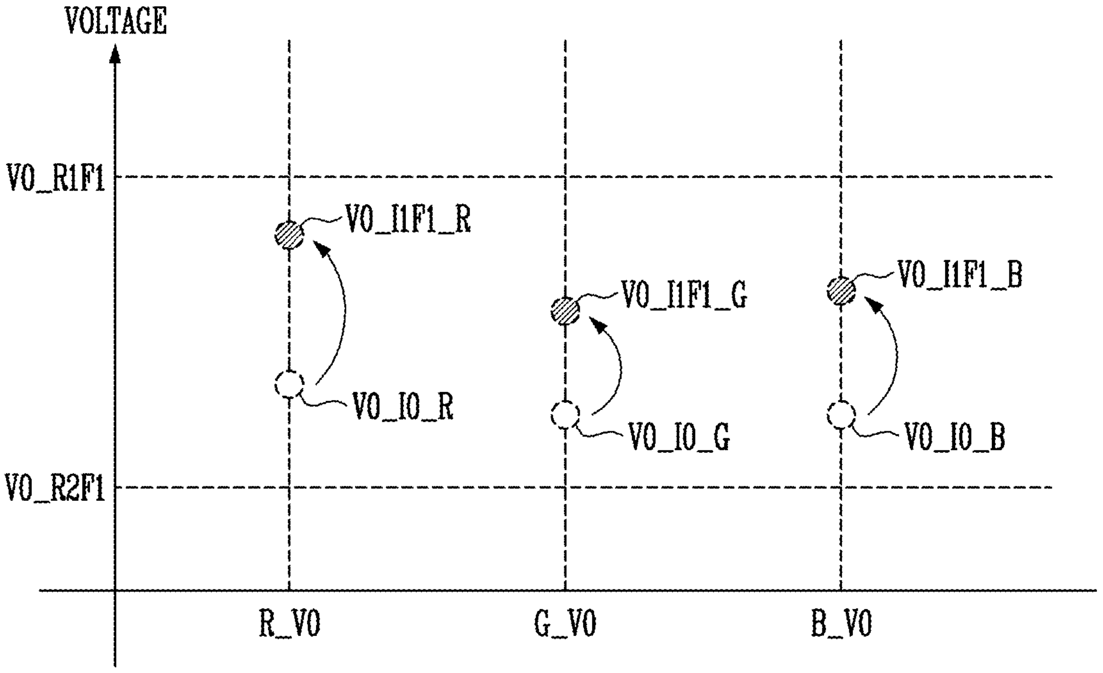

FIG. 8 is a diagram illustrating an embodiment of a black voltage corresponding to a dimming level. FIGS. 9 and 10 are diagrams illustrating a method of setting a black voltage corresponding to an auxiliary dimming level in accordance with an embodiment of the present disclosure.

In FIG. 8, a Y axis may represent voltage and an X axis may represent dimming level. In FIG. 8, two driving frequencies Freq1 and Freq2 are illustrated, but the present disclosure is not limited thereto. In another example, the display device 100 may be driven at three or more different driving frequencies. In FIG. 8, three reference dimming levels Ref1, Ref2, and Ref3, but the present disclosure is not limited thereto. In another example, four or more reference dimming levels may be included in the display device 100.

Referring to FIG. 8, the display device 100 may include a plurality of dimming levels, and some of the plurality of dimming levels may be classified into reference dimming levels Ref1, Ref2, and Ref3.

Reference black grayscale voltages V0_R1F1, V0_R2F1, V0_R3F1, V0_R1F2, V0_R2F2, and V0_R3F2 corresponding to driving frequencies (e.g., Freq1 and Freq2) and reference dimming levels Ref1, Ref2, and Ref3 may be pre-stored in the gamma driver 160.

At least one auxiliary dimming level IP1 and IP2 may be set between the reference dimming levels Ref1, Ref2, and Ref3.

In an embodiment, a first auxiliary dimming level IP1 may be a dimming level between a first reference dimming level Ref1 and a second reference dimming level Ref2. The first auxiliary dimming level IP1 may have a first auxiliary black grayscale voltage V0_I1F1, corresponding to a first driving frequency Freq1. The first auxiliary black grayscale voltage V0_11F1 may have a voltage between a first reference black grayscale voltage V0_R1F1 and a third reference black grayscale voltage V0_R2F1.

In an example, the first auxiliary black grayscale voltage V0_11F1 may have a voltage value higher than an average voltage of the first reference black grayscale voltage V0_R1F1 and the third reference black grayscale voltage V0_R2F1. In an example, the first auxiliary black grayscale voltage V0_11F1 may have a voltage value higher than a voltage obtained by interpolating the first reference black grayscale voltage V0_R1F1 and the third reference black grayscale voltage V0_R2F1 at the first auxiliary dimming level IP1.

A process of setting a voltage value of the first auxiliary black grayscale voltage V0_I1F1 will be described with reference to FIG. 9. In FIG. 9, R_V0 may represent a first auxiliary black grayscale voltage V0_I1F1 of a first pixel (e.g., a red pixel), G_V0 may represent a first auxiliary black grayscale voltage V0_I1F1 of a second pixel (e.g., a green pixel), and B_V0 may represent a first auxiliary black grayscale voltage V0_I1F1 of a third pixel (e.g., a blue pixel).

In FIG. 9, it is illustrated that the first pixel, the second pixel, and the third pixel have the same first auxiliary black grayscale voltage V0_I1F1. However, the present disclosure is not limited thereto. In another example, the first pixel, the second pixel, and the third pixel may have different voltages at the first auxiliary dimming level IP1. However, the first auxiliary black grayscale voltage V0_11F1 may be generated by reflecting the same weighted value (or offset), corresponding each of the first pixel, the second pixel, and the third pixel.

The gamma driver 160 may generate the first auxiliary black grayscale voltage V0_11F1 corresponding to the first auxiliary dimming level IP1, using the first reference black grayscale voltage V0_R1F1 of the first reference dimming level Ref1 and the third reference black grayscale voltage V0_R2F1 of the second reference dimming level Ref2.

In an example, when the voltage obtained by interpolating (e.g., linear interpolation) the first reference black grayscale voltage V0_R1F1 and the third reference black grayscale voltage V0_R2F1 has a first value V0_10, the gamma driver 160 may generate the first auxiliary black grayscale voltage V0_I1F1 to have a voltage higher than the first voltage V0_10.

In an example, a predetermined weighted value (or offset) may be stored in the gamma driver 160, and the gamma driver 160 may generate the first auxiliary black grayscale voltage V0_I1F1, using the weighted value. In an example, the gamma driver 160 may generate the first auxiliary black grayscale voltage V0_11F1 by reflecting the weighted value on a high reference black grayscale voltage (i.e., V0_R1F1) among reference dimming levels Ref1 and ReF2 adjacent to the first auxiliary dimming level IP1 (or to have a voltage as low as the weighted value). In an example, when a first power source Vreg (see FIG. 11) for generating a gamma voltage varies, the gamma driver 160 may reflect the weighted value on a high reference black grayscale voltage (i.e., V0_R1F1) among the adjacent reference dimming levels Ref1 and Ref2 for the purpose of securing of a driving margin, prevention of a luminance reversal phenomenon, and the like.

In an example, the gamma driver 160 may generate the first auxiliary black grayscale voltage V0_11F1 by reflecting the weighted value on a low reference black grayscale voltage (i.e., V0_R2F1) among reference dimming levels Ref1 and Ref2 adjacent to the first auxiliary dimming level IP1 (or to have a voltage as high as the weighted value).

In an example, the gamma driver 160 may generate the first auxiliary black grayscale voltage V0_I1F1 by reflecting the weighted value on the average voltage of the first reference black grayscale voltage V0_R1F1 and the third reference black grayscale voltage V0_R2F1 or the voltage obtained by interpolating (e.g., linear interpolation) the first reference black grayscale voltage V0_R1F1 and the third reference black grayscale voltage V0_R2F1 at the first auxiliary dimming level IP1 (or to have a voltage as high as the weighted value).

Figure 11:
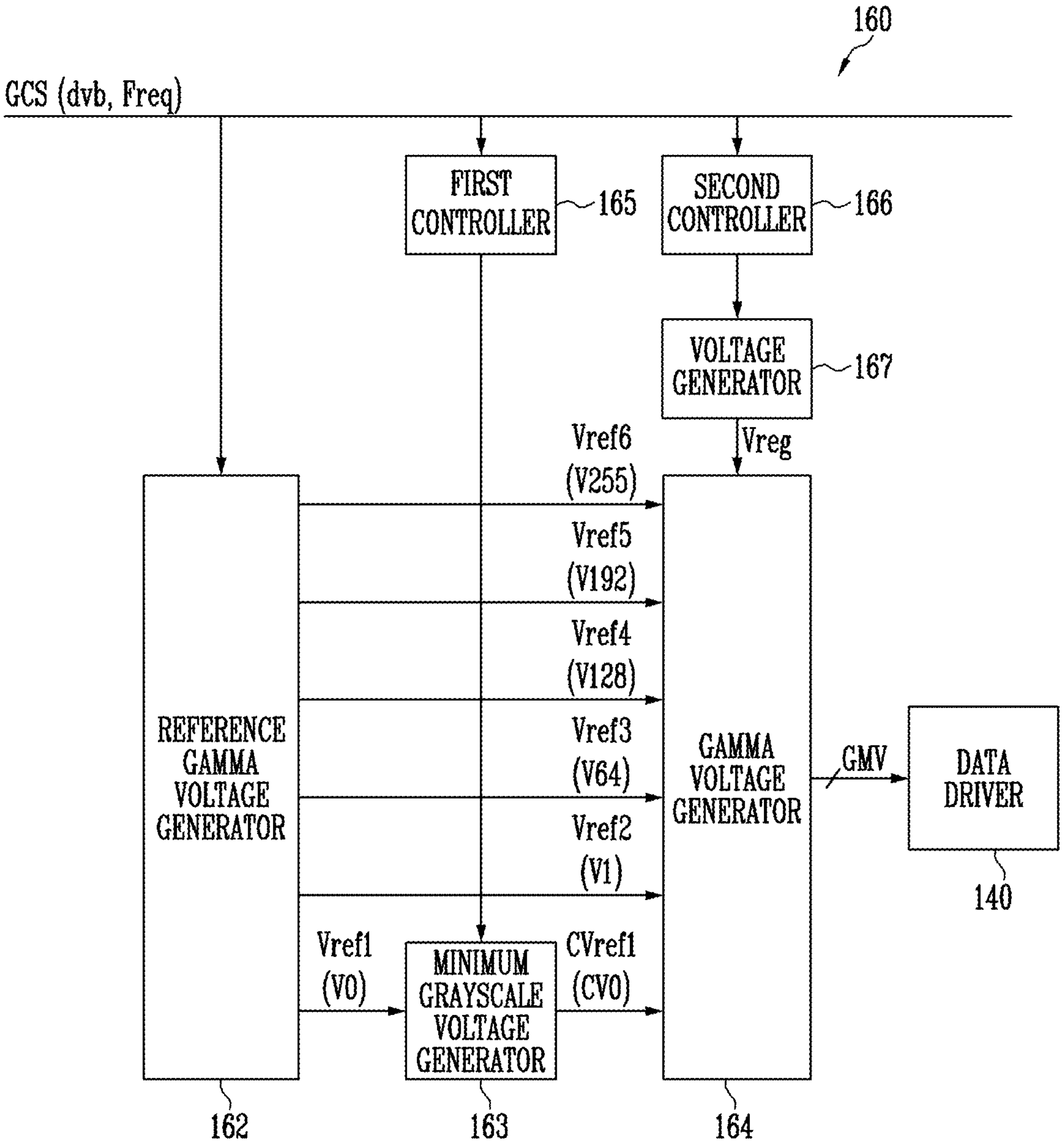
FIG. 11 is a diagram illustrating a gamma driver in accordance with an embodiment of the present disclosure.

In an example, the gamma driver 160 may generate the first auxiliary black grayscale voltage V0_I1F1 by reflecting the weighted value on a first reference gamma voltage Vref1 shown in FIG. 11 (e.g., corresponding to the black grayscale).

Referring to FIG. 10, the first auxiliary black grayscale voltage V0_I1F1 may have different voltages, corresponding to at least two pixels among the first pixel, the second pixel, and the third pixel. In an example, the gamma driver 160 may generate the first auxiliary black grayscale voltage V0_11F1 by reflecting different weighted values, corresponding to at least two pixels among the first pixel, the second pixel, and the third pixel.

The gamma driver 160 may generate a first auxiliary black grayscale voltage V0_11F1 corresponding to the first auxiliary dimming level IP1, using the first reference black grayscale voltage V0_R1F1 of the first reference dimming level Ref1 and the third reference black grayscale voltage V0_R2F1 of the second reference dimming level Ref2.

In an example, when the voltage obtained by interpolating the first reference black grayscale voltage V0_R1F1 and the third reference black grayscale voltage V0_R2F1 has a first voltage V0_10 (V0_10_R, V0_10_G, and V0_10_B), the gamma driver 160 may generate a first auxiliary black grayscale voltage V0_I1F1 (V0_I1F1_R, V0_I1F1_G, and V0_I1F1_B) to have a voltage higher than the first voltage V0_10.

In an example, a predetermined weighted value (or offset) may be stored in the gamma driver 160, and the gamma driver 160 may generate the first auxiliary black grayscale voltage V0_I1F1, using the weighted value. The weighted value may have different weighted values in at least two pixels (at least two of the first pixel, the second pixel, and the third pixel), corresponding to the first pixel, the second pixel, and the third pixel.

In an example, the gamma driver 160 may generate a first auxiliary black grayscale voltage V0_I1F1_R by reflecting a first weighted value on high reference back grayscale voltage (i.e., V0_R1F1) among reference dimming levels Ref1 and Ref2 adjacent to the first auxiliary dimming level IP1 (or to have a voltage as low as the first weighted value), corresponding to the first pixel.

In an example, the gamma driver 160 may generate the first auxiliary black grayscale voltage V0_I1F1_R by reflecting the first weighted value on low reference back grayscale voltage (i.e., V0_R2F1) among the reference dimming levels Ref1 and Ref2 adjacent to the first auxiliary dimming level IP1 (or to have a voltage as high as the first weighted value), corresponding to the first pixel.

In an example, the gamma driver 160 may generate the first auxiliary black grayscale voltage V0_I1F1_R by reflecting the first weighted value on a voltage obtained by interpolating (e.g., linear interpolation) the first reference black grayscale voltage V0_R1F1 and the third reference black grayscale voltage V0_R2F1 or the average voltage of the first reference black grayscale voltage V0_R1F1 and the third reference black grayscale voltage V0_R2F1 (or to have a voltage as high as the first weighted value), corresponding to the first pixel.

In an example, the gamma driver 160 may generate the first auxiliary black grayscale voltage V0_I1F1_R by reflecting the first weighted value on the first reference gamma voltage Vref1 shown in FIG. 11 (e.g., corresponding to the black grayscale).

In an example, the gamma driver 160 may generate a first auxiliary black grayscale voltage V0_I1F1_G by reflecting a second weighted value on a high reference black grayscale voltage (i.e., V0_R1F1) among the reference dimming levels Ref1 and Ref2 adjacent to the first auxiliary dimming level IP1 (or to have a voltage as low as the second weighted value), corresponding to the second pixel.

In an example, the gamma driver 160 may generate the first auxiliary black grayscale voltage V0_I1F1_G by reflecting the second weighted value on a low reference black grayscale voltage (i.e., V0_R2F1) among the reference dimming levels Ref1 and Ref2 adjacent to the first auxiliary dimming level IP1 (or to have a voltage as high as the second weighted value), corresponding to the second pixel.

In an example, the gamma driver 160 may generate the first auxiliary black grayscale voltage V0_I1F1_G by reflecting the second weighted value on a voltage obtained by interpolating (e.g., linear interpolation) the first reference black grayscale voltage V0_R1F1 and the third reference black grayscale voltage V0_R2F1 or the average voltage of the first reference black grayscale voltage V0_R1F1 and the third reference black grayscale voltage V0_R2F1 (or to have a voltage as high as the second weighted value), corresponding to the second pixel.

In an example, the gamma driver 160 may generate the first auxiliary black grayscale voltage V0_I1F1_G by reflecting the second weighted value on the first reference gamma voltage Vref1 shown in FIG. 11 (e.g., corresponding to the black grayscale).

In an example, the gamma driver 160 may generate a first auxiliary black grayscale voltage V0_11F1_B by reflecting a third weighted value on a high reference black grayscale voltage (i.e., V0_R1F1) among the reference dimming levels Ref1 and Ref2 adjacent to the first auxiliary dimming level IP1 (or to have a voltage as low as the third weighted value), corresponding to the third pixel. In an example, the gamma driver 160 may generate the first auxiliary black grayscale voltage V0_I1F1_B by reflecting the third weighted value on a low reference black grayscale voltage (i.e., V0_R2F1) among the reference dimming levels Ref1 and Ref2 adjacent to the first auxiliary dimming level IP1 (or to have a voltage as high as the third weighted value), corresponding to the third pixel.

In an example, the gamma driver 160 may generate the first auxiliary black grayscale voltage V0_I1F1_B by reflecting the third weighted value on a voltage obtained by interpolating (e.g., linear interpolation) the first reference black grayscale voltage V0_R1F1 and the third reference black grayscale voltage V0_R2F1 or the average voltage of the first reference black grayscale voltage V0_R1F1 and the third reference black grayscale voltage V0_R2F1 (or to have a voltage as high as the third weighted value), corresponding to the third pixel.

In an example, the gamma driver 160 may generate the first auxiliary black grayscale voltage V0_I1F1_B by reflecting the third weighted value on the first reference gamma voltage Vref1 shown in FIG. 11 (e.g., corresponding to the black grayscale).

In an embodiment, the first weighted value may be set such that the first auxiliary black grayscale voltage V0_I1F1_R of the first pixel has a higher voltage than the first auxiliary black grayscale voltage V0_I1F1_G of the second pixel.

In an embodiment, the third weighted value may be set such that the first auxiliary black grayscale voltage V0_I1F1_B of the third pixel has a higher voltage than the first auxiliary black grayscale voltage V0_I1F1_G of the second pixel.

Referring to FIG. 8, after the first auxiliary black grayscale voltage V0_I1F1 of the first auxiliary dimming level IP1 is set, a black grayscale voltage corresponding to the first driving frequency Freq1 of dimming levels between the first auxiliary dimming level IP1 and the first reference dimming level Ref1 may be set by interpolating (e.g., linear interpolation) the first auxiliary black grayscale voltage V0_I1F1 of the first auxiliary dimming level IP1 and the first reference black grayscale voltage V0_R1F1 of the first reference dimming level Ref1.

In an embodiment, after the first auxiliary black grayscale voltage V0_11F1 of the first auxiliary dimming level IP1 is set, a black grayscale voltage corresponding to the first driving frequency Freq1 of dimming levels between the first auxiliary dimming level IP1 and the first reference dimming level Ref1 may be set by interpolating (e.g., linear interpolation) the first auxiliary black grayscale voltage V0_I1F1 of the first auxiliary dimming level IP1 and the third reference black grayscale voltage V0_R2F1 of the second reference dimming level Ref2.

In an embodiment, in the first auxiliary dimming level IP1, a second auxiliary black grayscale voltage V0_I1F2 corresponding to the second driving frequency Freq2 may be obtained using the substantially same method as the first auxiliary black grayscale voltage V0_I1F1 corresponding to the first driving frequency Freq1.

In an example, the second auxiliary black grayscale voltage V0_11F2 may have a voltage between the second reference black grayscale voltage V0_R1F2 and the fourth reference black grayscale voltage V0_R2F2.

In an example, the second auxiliary black grayscale voltage V0_11F2 may have a voltage value higher than an average voltage of the second reference black grayscale voltage V0_R1F2 and the fourth reference black grayscale voltage V0_R2F2. In an example, the second auxiliary black grayscale voltage V0_I1F2 may have a voltage value higher than a voltage obtained by interpolating (e.g., linear interpolation) the second reference black grayscale voltage V0_R1F2 and the fourth reference black grayscale voltage V0_R2F2 at the first auxiliary dimming level IP1. The second auxiliary black grayscale voltage V0_11F2 may be obtained by reflecting a weighted value on the second reference black grayscale voltage V0_R1F2 and/or the fourth reference black grayscale voltage V0_R2F2.

In an embodiment, after the second auxiliary black grayscale voltage V0_I1F2 of the first auxiliary dimming level IP1 is set, a black grayscale voltage corresponding to the second driving frequency Freq2 of dimming levels between the first auxiliary dimming level IP1 and the first reference dimming level Ref1 may be set by interpolating (e.g., linear interpolation) the second auxiliary black grayscale voltage V0_I1F2 of the first auxiliary dimming level IP1 and the second reference black grayscale voltage V0_R1F2 of the first reference dimming level Ref1.

In an embodiment, after the second auxiliary black grayscale voltage V0_I1F2 of the first auxiliary dimming level IP1 is set, a black grayscale voltage corresponding to the second driving frequency Freq2 of dimming levels between the first auxiliary dimming level IP1 and the second reference dimming level Ref2 may be set by interpolating (e.g., linear interpolation) the second auxiliary black grayscale voltage V0_I1F2 of the first auxiliary dimming level IP1 and the fourth reference black grayscale voltage V0_R2F2 of the second reference dimming level Ref2.

A third auxiliary black grayscale voltage V0_I2F1 may be generated by reflecting a weighted value on the third reference black grayscale voltage V0_R2F1 and/or the fifth reference black grayscale voltage V0_R3F1, and detailed description related to this will be omitted. Similarly, a fourth auxiliary black grayscale voltage V0_I2F2 may be generated by reflecting a weighted value on the fourth reference black grayscale voltage V0_R2F2 and/or the sixth reference black grayscale voltage V0_R3F2, and detailed description related to this will be omitted.

As described above, in the embodiment of the present disclosure, at least one auxiliary dimming level IP1 and IP2 is set between the reference dimming levels Ref1, Ref2, and Ref3, and an auxiliary black grayscale voltage V0_I1F1, V0_I1F2, V0_I2F1, and V0_I2F2 corresponding to the at least one dimming level IP1 and IP2 is set. The auxiliary black grayscale voltage V0_I1F1, V0_I1F2, V0_I2F1, and V0_12F2 has an intermediate value of adjacent reference dimming levels or a voltage higher than an interpolation value, and accordingly, the black expression ability of the pixels PX can be effectively improved.

In addition, a black grayscale voltage corresponding to the other dimming levels are generated by interpolating reference black grayscale voltages between reference dimming levels adjacent to the auxiliary black grayscale voltage V0_I1F1, V0_I1F2, V0_I2F1, and V0_I2F2. Accordingly, the black luminance can be improved, and the capacity of the memory can be effectively minimized, thereby reducing manufacturing cost.

FIG. 11 is a diagram illustrating a gamma driver in accordance with an embodiment of the present disclosure.

Referring to FIG. 11, the gamma driver 160 in accordance with the embodiment of the present disclosure may include a reference gamma voltage generator 162, a minimum grayscale voltage generator 163, a gamma voltage generator 164, a first controller 165, a second controller 166, and a voltage generator 167.

The reference gamma voltage generator 162 may generate reference gamma voltages Vref1, Vref2, Vref3, Vref4, Vref5, and Vref6, corresponding to a driving frequency of the display device 100 and dimming level information, which are included in a gamma driving signal GCS. Each of the reference gamma voltages Vref1 to Vref6 may have a gamma voltage corresponding to a predetermined grayscale.

In an example, a first reference gamma voltage Vref1 may have a grayscale of 0 (minimum grayscale, or black grayscale), a second reference gamma voltage Vref2 may have a grayscale of 1, a third reference gamma voltage Vref3 may have a grayscale of 64, a fourth reference gamma voltage Vref4 may have a grayscale of 123, a fifth reference gamma voltage Vref5 may have a grayscale of 192, and a sixth reference gamma voltage Vref6 may have a grayscale of 255. The reference gamma voltage generator 162 may generate at least two reference gamma voltages Vref1 to Vref6 corresponding to some grayscales, and the grayscales of the reference gamma voltages Vref1 to Vref6 may have various grayscales currently known in the art.

The first controller 165 may have weighted value information corresponding to the driving frequency of the display device 100 and the dimming level information, which are included in the gamma driving signal GCS. The first controller 165 may supply, to the minimum grayscale voltage generator 163, a weighted value corresponding to a current driving frequency at which the display device 100 is driven and the dimming level information.

The minimum grayscale voltage generator 163 may generate at least one auxiliary black grayscale voltage V0_I1F1, V0_I1F2, V0_I2F1, and V0_12F2 corresponding to at least one auxiliary dimming level IP1 and IP2, using the weighted value. Also, the minimum grayscale voltage generator 163 may generate a black grayscale voltage of other dimming levels, using the generated at least one auxiliary black grayscale voltage V0_I1F1, V0_I1F2, V0_I2F1, and V0_I2F2 and pre-stored at least two reference black grayscale voltages V0_R1F1, V0_R1F2, V0_R2F1, V0_R2F2, V0_R3F1, and V0_R3F2.

In an example, the display device 100 may be driven at the first driving frequency Freq1, and be driven at a dimming level between a first auxiliary dimming level IP1 and a first reference dimming level Ref1. The first controller 165 may supply a weighted value corresponding to a first auxiliary dimming level IP1 to the minimum grayscale voltage generator 163.

The minimum grayscale voltage generator 163 may generate a first auxiliary black grayscale voltage V0_I1F1, using the weighted value supplied from the first controller 165.

In an example, the minimum grayscale voltage generator 163 may generate the first auxiliary black grayscale voltage V0_I1F1 by reflecting the weighted value on a first reference gamma voltage Vref1 (i.e., V0).

In an example, the minimum grayscale voltage generator 163 may generate the first auxiliary black grayscale voltage V0_11F1 by reflecting the weighted value on at least one of reference black grayscale voltages of adjacent reference dimming levels.

In an example, the minimum grayscale voltage generator 163 may generate the first auxiliary black grayscale voltage V0_11F1 by reflecting the weighted value on an intermediate value or interpolation value of reference black grayscale voltages of adjacent reference dimming levels.

In addition, the minimum grayscale voltage generator 163 may generate a black grayscale voltage CV0 corresponding to a current dimming level at which the display device 100 is driven by interpolating the first auxiliary black grayscale voltage V0_I1F1 and a first reference black grayscale voltage V0_R1F1. The black grayscale voltage CV0 generated by the minimum grayscale voltage generator 163 may be supplied to the gamma voltage generator 164 as a corrected first reference gamma voltage CVref1.

The gamma voltage generator 164 may generate gamma voltages GMV, using the reference gamma voltages Vref2 to Vref6 and the corrected first reference gamma voltage CVref1. The gamma voltages GMV generated by the gamma voltage generator 164 may be supplied to the data driver 140.

The second controller 166 may store voltage information of a first power source Vreg corresponding to the driving frequency of the display device 100 and the dimming level information, which are included in the gamma driving signal GCS. The second controller 166 may supply, to the voltage generator 167, the voltage information of the first power source Vreg corresponding to the driving frequency of the display device 100 and the dimming level information.

The voltage generator 167 may generate the first power source Vreg, corresponding to the voltage information of the first power source Vreg, and supply the first power source Vreg to the gamma voltage generator 164. The gamma voltage generator 164 may generate the gamma voltages GMV by dividing the first power source Vreg. When the first power source Vreg is fixed to a certain value, the second controller 166 and the voltage generator 167 may be omitted.

Figure 12:
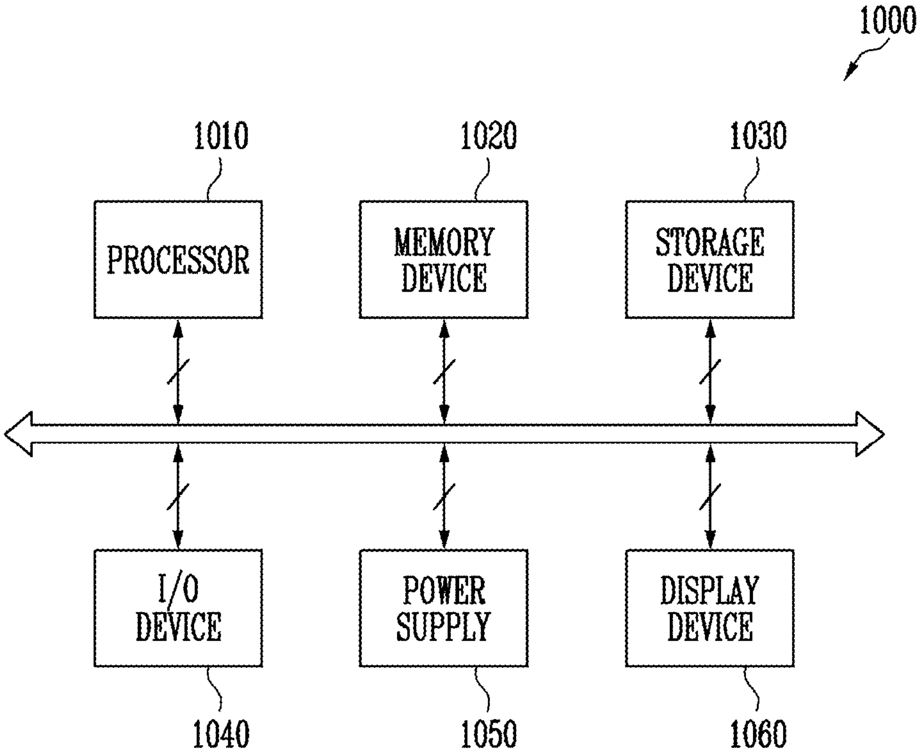
FIG. 12 is a schematic block diagram illustrating an electronic device 1000 including a display device in accordance with an embodiment.
Figure 13:
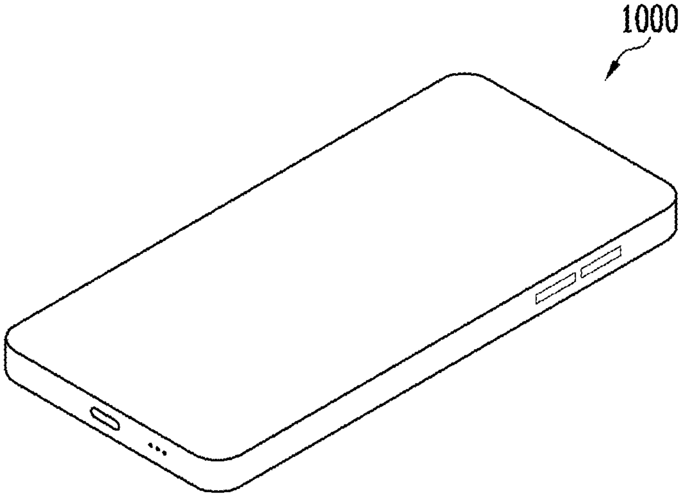
FIG. 13 is a schematic diagram illustrating an example where the electronic device 1000 of FIG. 12 is a smartphone.
Figure 14:
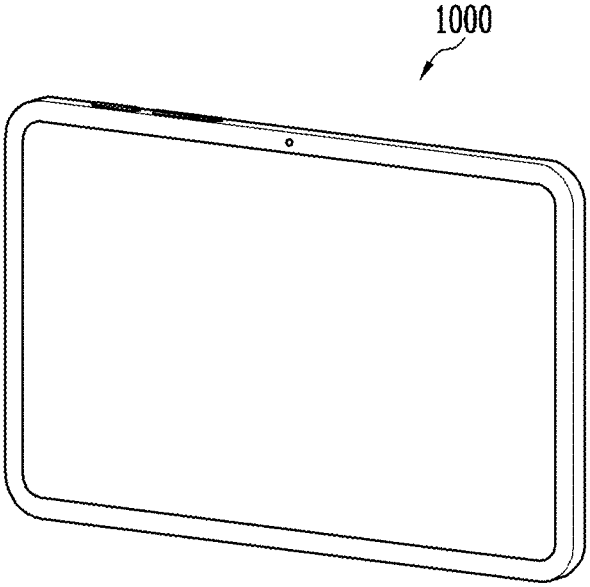
FIG. 14 is a schematic diagram illustrating an example where the electronic device 1000 of FIG. 12 is a tablet computer.

FIG. 12 is a schematic block diagram illustrating an electronic device 1000 including a display device in accordance with an embodiment. FIG. 13 is a schematic diagram illustrating an example where the electronic device 1000 of FIG. 12 is a smartphone. FIG. 14 is a schematic diagram illustrating an example where the electronic device 1000 of FIG. 12 is a tablet computer.

Referring to FIGS. 12 to 14, the electronic device 1000 may include a processor 1010, a memory device 1020, a storage device 1030, an input/output (I/O) device 1040, a power supply 1050, and a display device 1060. The display device 1060 may be the display device 100 of FIG. 1. The electronic device 1000 may further include various ports for communication with a video card, a sound card, a memory card, a USB device, or other systems. In an embodiment, as illustrated in FIG. 13, the electronic device 1000 may be a smartphone. In an embodiment, as illustrated in FIG. 14, the electronic device 1000 may be a tablet computer. However, the aforementioned examples are illustrative, and the electronic device 1000 is not necessarily limited to the aforementioned examples. For example, the electronic device 1000 may be a cellular phone, a video phone, a smart pad, a smartwatch, a navigation device for vehicles, a computer monitor, a laptop computer, a head-mounted display device, or the like.

The processor 1010 may perform specific calculations or tasks. In an embodiment, the processor 1010 may include at least one of a central processing unit, an application processor, a graphic processing unit, a communication processor, an image signal processor, a controller, or the like. The processor 1010 may be connected to other components through an address bus, a control bus, a data bus, and the like. In an embodiment, the processor 1010 may be connected to an expansion bus such as a peripheral component interconnect (PCI) bus. In an embodiment, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be integrated with the I/O device 1040. The power supply 1050 may supply power needed to perform the operation of the electronic device 1000. For example, the power supply 1050 may include a power management integrated circuit (PMIC). In an embodiment, the power supply 1050 may supply power to the display device 1060.

The display device 1060 may display images in response to image data signals and/or control signals from the processor 1010. The display device 1060 may be connected to other components through the buses or other communication links.

In the display device and the method of driving the same in accordance with the present disclosure, black voltages of reference dimming levels are predetermined, and a black voltage of at least one auxiliary dimming level between the reference dimming levels. The black voltage of the auxiliary dimming level has a voltage higher than a value obtained by interpolating the black voltages of the reference dimming levels and/or an intermediate value of the black voltages of the reference dimming levels, and accordingly, the black expression ability of the display device can be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

pixels connected to scan lines and data lines;

a data driver configured to generate a data signal to be supplied to the data lines, using gamma voltages; and a gamma driver configured to generate the gamma voltages, wherein the gamma driver includes:

a minimum grayscale voltage generator configured to store a first reference black grayscale voltage corresponding to a first reference dimming level and a second reference black grayscale voltage which corresponds to a second reference dimming level and has a voltage lower than the first reference black grayscale voltage, and generate an auxiliary black grayscale voltage of an auxiliary dimming level between the first reference dimming level and the second reference dimming level, and wherein the auxiliary black grayscale voltage has a voltage higher than a voltage obtained by interpolating the first reference black grayscale voltage and the second reference black grayscale voltage at the auxiliary dimming level.

2. The display device of claim 1, wherein the auxiliary black grayscale voltage has a voltage higher than an average voltage of the first reference black grayscale voltage and the second reference black grayscale voltage.

3. The display device of claim 1, wherein the gamma driver further includes a first controller configured to supply, to the minimum grayscale voltage generator, a weighted value corresponding to a current dimming level and a current driving frequency, at which the display device is driven, and wherein the minimum grayscale voltage generator generates the auxiliary black grayscale voltage, using the weighted value.

4. The display device of claim 3, wherein the minimum grayscale voltage generator generates the auxiliary black grayscale voltage by reflecting the weighted value on the first reference black grayscale voltage.

5. The display device of claim 3, wherein the minimum grayscale voltage generator generates the auxiliary black grayscale voltage by reflecting the weighted value on the second reference black grayscale voltage.

6. The display device of claim 3, wherein the minimum grayscale voltage generator generates the auxiliary black grayscale voltage by reflecting the weighted value on an average voltage of the first reference black grayscale voltage and the second reference black grayscale voltage or an interpolation voltage of the first reference black grayscale voltage and the second reference black grayscale voltage.

7. The display device of claim 3, wherein the pixels includes a first pixel for emitting light of a first color, a second pixel for emitting light of a second color, and a third pixel for emitting light of a third color.

8. The display device of claim 7, wherein the weighted value has a same value in the first pixel, the second pixel, and the third pixel.

9. The display device of claim 7, wherein the weighted value has different values in at least two pixels among the first pixel, the second pixel, and the third pixel.

10. The display device of claim 9, wherein the first pixel is a red pixel, and the second pixel is a green pixel, and wherein the weighted value is set such that the auxiliary black grayscale voltage for the first pixel has a voltage higher than the auxiliary black grayscale voltage for the second pixel.

11. The display device of claim 9, wherein the second pixel is a green pixel, and the third pixel is a blue pixel, and wherein the weighted value is set such that the auxiliary black grayscale voltage for the third pixel has a voltage higher than the auxiliary black grayscale voltage for the second pixel.

12. The display device of claim 3, wherein the gamma driver further includes:

a reference gamma voltage generator configured to generate a plurality of reference gamma voltages including a first reference gamma voltage corresponding to a black grayscale, the current dimming level and the current driving frequency; and a gamma voltage generator configured to generate the gamma voltages by dividing a voltage of a power source, based on the reference gamma voltages.

13. The display device of claim 12, wherein the minimum grayscale voltage generator generates the auxiliary black grayscale voltage by reflecting the weighted value on the first reference gamma voltage.

14. The display device of claim 12, wherein the gamma driver further includes:

a second controller configured to store voltage information of the power source, corresponding to a plurality of driving frequencies including the current driving frequency and a plurality of dimming levels including the current dimming level, and output voltage information of the power source, corresponding to the current dimming level and the current driving frequency; and a voltage generator configured to supply, to the gamma voltage generator, the power source, which has a voltage value corresponding to the voltage information output from the second controller.

15. The display device of claim 1, wherein the minimum grayscale voltage generator is configured to:

generates a black grayscale voltage of dimming levels between the first reference dimming level and the auxiliary dimming level by interpolating the first reference black grayscale voltage and the auxiliary black grayscale voltage; and generates a black grayscale voltage of dimming levels between the second reference dimming level and the auxiliary dimming level by interpolating the second reference black grayscale voltage and the auxiliary black grayscale voltage.

16. The display device of claim 1, wherein the minimum grayscale voltage generator is configured to set a voltage of a black grayscale to decrease as a driving frequency increases at a same dimming level.

17. A method of driving a display device, the method comprising:

storing a first reference black grayscale voltage corresponding to a first reference dimming level among a plurality of dimming levels and a second reference black grayscale voltage corresponding to a second reference dimming level among the plurality of dimming levels; and generating an auxiliary black grayscale voltage of an auxiliary dimming level between the first reference dimming level and the second reference dimming level, wherein the auxiliary black grayscale voltage has a voltage higher than a voltage obtained by interpolating the first reference black grayscale voltage and the second reference black grayscale voltage at the auxiliary dimming level.

18. The method of claim 17, wherein the auxiliary black grayscale voltage has a voltage higher than an average voltage of the first reference black grayscale voltage and the second reference black grayscale voltage.

19. The method of claim 17, wherein the auxiliary black grayscale voltage is generated by reflecting a weighted value on a reference gamma voltage corresponding to a black grayscale, the first reference black grayscale voltage, or the second reference black grayscale voltage.

20. An electronic device, comprising:

a processor configured to provide input image data;

a display device configured to display an image based on the input image data;

wherein the display device comprises:

pixels connected to scan lines and data lines;

a data driver configured to generate a data signal to be supplied to the data lines, using gamma voltages; and a gamma driver configured to generate the gamma voltages, wherein the gamma driver includes:

a minimum grayscale voltage generator configured to store a first reference black grayscale voltage corresponding to a first reference dimming level and a second reference black grayscale voltage which corresponds to a second reference dimming level and has a voltage lower than the first reference black grayscale voltage, and generate an auxiliary black grayscale voltage of an auxiliary dimming level between the first reference dimming level and the second reference dimming level, and wherein the auxiliary black grayscale voltage has a voltage higher than a voltage obtained by interpolating the first reference black grayscale voltage and the second reference black grayscale voltage at the auxiliary dimming level.

* * * * *